US012594699B2

(12) United States Patent
Hira et al.

(10) Patent No.: US 12,594,699 B2
(45) Date of Patent: Apr. 7, 2026

(54) METHOD FOR PRODUCING POLYPROPYLENE-BASED RESIN EXPANDED BEADS

(71) Applicant: JSP CORPORATION, Tokyo (JP)

(72) Inventors: Akinobu Hira, Kanuma (JP); Tokunobu Nohara, Tokyo (JP)

(73) Assignee: JSP CORPORATION, Tokyo (JP)

( * ) Notice: Subject to any disclaimer, the term of this patent is extended or adjusted under 35 U.S.C. 154(b) by 60 days.

(21) Appl. No.: 18/694,740

(22) PCT Filed: Aug. 16, 2022

(86) PCT No.: PCT/JP2022/030993
§ 371 (c)(1),
(2) Date: Mar. 22, 2024

(87) PCT Pub. No.: WO2023/053757
PCT Pub. Date: Apr. 6, 2023

(65) Prior Publication Data
US 2025/0001657 A1    Jan. 2, 2025

(30) Foreign Application Priority Data

Sep. 29, 2021    (JP) ................................. 2021-159885

(51) Int. Cl.
*B29C 44/34*        (2006.01)
*B29C 44/02*        (2006.01)
(Continued)

(52) U.S. Cl.
CPC .......... *B29C 44/3461* (2013.01); *B29C 44/02* (2013.01); *B29C 44/3442* (2013.01);
(Continued)

(58) Field of Classification Search
CPC ............. B29C 44/3442; C08J 2201/034; C08J 2201/00
See application file for complete search history.

(56) References Cited

U.S. PATENT DOCUMENTS

2004/0171708 A1     9/2004  Yoshizawa et al.
2004/0254254 A1*   12/2004  Hashimoto ............ C08J 9/0066
                                                         521/57
(Continued)

FOREIGN PATENT DOCUMENTS

JP        H07-300537 A    11/1995
JP        H08-281762 A    10/1996
(Continued)

OTHER PUBLICATIONS

Oct. 25, 2024 extended Search Report issued in European Patent Application No. 22875631.8.
(Continued)

*Primary Examiner* — Farah Taufiq
(74) *Attorney, Agent, or Firm* — Oliff PLC

(57)            ABSTRACT

A method for producing polypropylene-based resin expanded beads containing a post-consumer recycled material of a polypropylene-based resin foamed molded article containing carbon black in order to enable provision of a black expanded beads molded article excellent in appearance and physical properties using a post-consumer recycled material of a polypropylene-based resin foamed molded article containing carbon black. The method includes: a mixing step of melt-mixing a polypropylene-based resin at 230° C. under a load of 2.16 kg and a polypropylene-based resin recovered materials including of a recovered materials of a post-consumer recycled material of a polypropylene-based resin foamed molded article with an extruder to obtain a mixture; an extrusion step; and a foaming step, wherein in
(Continued)

the mixture, the polypropylene-based resin recovered materials contains carbon black.

10 Claims, 1 Drawing Sheet

(51) Int. Cl.
   *B29K 23/00*       (2006.01)
   *B29K 105/04*     (2006.01)
   *B29K 507/04*     (2006.01)

(52) U.S. Cl.
   CPC ...... *B29K 2023/12* (2013.01); *B29K 2105/04* (2013.01); *B29K 2507/04* (2013.01)

(56) References Cited

U.S. PATENT DOCUMENTS

2009/0156700 A1* 6/2009 Oikawa ...................... C08J 9/18
                                                 521/143

2014/0097389 A1* 4/2014 Chiba ...................... C08J 9/008
                                              252/511
2018/0371223 A1* 12/2018 Ishida ................... B32B 27/302
2024/0026107 A1* 1/2024 Otani ......................... C08J 9/18

FOREIGN PATENT DOCUMENTS

| | | | |
|---|---|---|---|
| JP | 2003-039565 | A | 2/2003 |
| JP | 2004-263033 | A | 9/2004 |
| JP | 2005-023302 | A | 1/2005 |
| JP | 2005-297464 | A | 10/2005 |
| JP | 2006-116818 | A | 5/2006 |
| JP | 2006-232939 | A | 9/2006 |
| JP | 2007-283576 | A | 11/2007 |

OTHER PUBLICATIONS

Oct. 25, 2022 International Search Report issued in International Patent Application No. PCT/JP2022/030993.
Oct. 25, 2022 Written Opinion of the International Searching Authority issued in International Patent Application No. PCT/JP2022/030993.

* cited by examiner

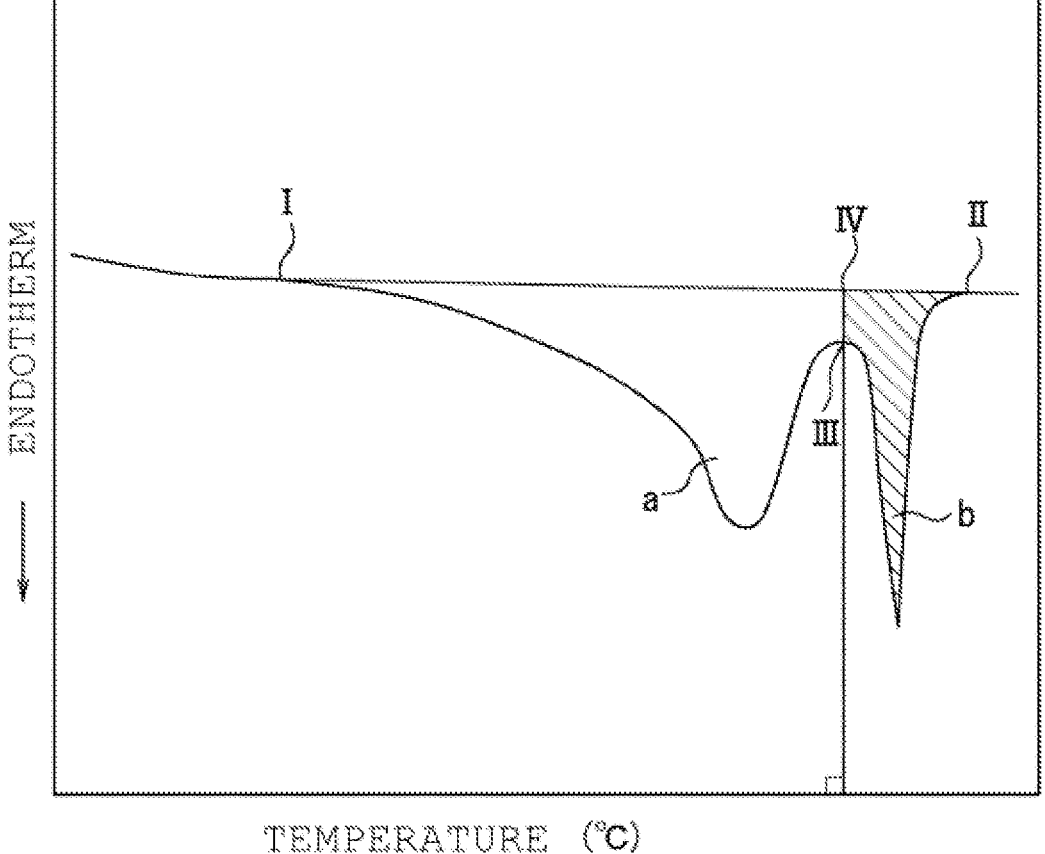

METHOD FOR PRODUCING POLYPROPYLENE-BASED RESIN EXPANDED BEADS

TECHNICAL FIELD

The present invention relates to a method for producing polypropylene-based resin expanded beads, and more particularly to a method for producing polypropylene-based resin expanded beads using a resin material containing a post-consumer recycled material of a polypropylene-based resin foamed molded article.

BACKGROUND ART

A polypropylene-based resin foamed molded article using a polypropylene-based resin is excellent in lightweight properties, cushioning properties, and toughness. Therefore, the polypropylene-based resin foamed molded article is widely used as cushioning materials for automobiles such as bumper core members, seat core members, and sun visor core members, cushioning packaging materials for electric and electronic device packaging materials, and the like. In parallel with the use of such a polypropylene-based resin foamed molded article, recycling such as reuse of scrap and the like generated in a step of producing a polypropylene-based resin foamed molded article, and use of waste materials and the like of a polypropylene-based resin foamed molded article generated in the same factory or the same step is performed.

In a movement to promote a recycling-oriented society in recent years, there is an increasing social demand for not only recycling such as the reuse of scrap and the like described above and the use of the waste materials, but also using waste used by an end user as a recycled material. Hereinafter, the above recycled material may be referred to as a post-consumer recycled material.

On the other hand, a technique related to use of a used polyolefin-based resin foamed molded article has been proposed. For example, Patent Literatures 1 to 3 propose a technique in which a granulated material obtained by crushing and granulating a waste polyolefin-based resin foamed molded article is mixed with a virgin polyolefin-based resin to prepare pellets, and the pellets are impregnated with a blowing agent or the like to produce a polyolefin-based resin foamed molded article. These literatures describe that the foamed molded article provided by such a technique has less deterioration in quality as compared with a foamed molded article produced using a virgin polyolefin-based resin.

Patent Literature 4 proposes a technique in which a base material resin containing 60 wt % or more of a polypropylene-based resin is extruded into an extruded resin, and a blowing agent is added to the extruded resin to foam the resin, thereby producing a polypropylene-based resin foamed article. Patent Literature 4 describes that a used molded article broken or crushed may be used as the base material resin. In addition, Patent Literature 4 points out that when a polypropylene-based resin foamed article is produced by extrusion molding, a melt flow rate of a polypropylene-based resin material increases in an extruder, which causes a problem that a difference occurs in physical properties of an extrusion molded article. In addition, Patent Literature 4 describes that it is desirable that the extruded resin exhibits a melt flow rate in a predetermined range in order to solve the problem.

CITATION LIST

Patent Literature

Patent Literature 1: JP 2005-297464 A
Patent Literature 2: JP 2006-116818 A
Patent Literature 3: JP 2007-283576 A
Patent Literature 4: JP H08-281762 A

SUMMARY OF INVENTION

Technical Problem

Meanwhile, for the purpose of improving designability of a foamed molded article, carbon black may be contained in a polypropylene-based resin foamed article. Hereinafter, the carbon black may be simply referred to as CB. For example, demand for a black polypropylene-based resin foamed article as a cushioning member for automobiles is increasing. Therefore, use of a post-consumer recycled material is expected also in production of a black polypropylene-based resin foamed article. In particular, if a black polypropylene-based resin foamed article can be newly produced using a post-consumer recycled material of a foamed molded article containing CB, the CB can also be recycled, and the amount of CB to be newly blended can be reduced, which is preferable. However, none of the above Patent Literatures 1 to 4 have studied use of a post-consumer recycled material of a foamed molded article containing CB.

Therefore, the present inventors have studied production of a black expanded beads molded article using a post-consumer recycled material of a polypropylene-based resin foamed molded article containing CB. As a result of such study, it has been found that an expanded beads molded article produced using a post-consumer recycled material containing CB tends to have a poor appearance and inferior physical properties such as tensile strength and compressive strength as compared with an expanded beads molded article produced using a post-consumer recycled material not containing CB.

The present invention has been made in view of such a background. That is, the present invention provides a method for producing polypropylene-based resin expanded beads containing a post-consumer recycled material of a polypropylene-based resin foamed molded article containing CB in order to enable provision of a black expanded beads molded article excellent in appearance and physical properties using a post-consumer recycled material of a polypropylene-based resin foamed molded article containing CB.

Solution to Problem

A method for producing polypropylene-based resin expanded beads of the present invention includes: a mixing step of melt-mixing a polypropylene-based resin having a melt flow rate of 1 g/10 min or more and 15 g/10 min or less at 230° C. under a load of 2.16 kg and a polypropylene-based resin recovered materials comprising of a recovered materials of a post-consumer recycled material of a polypropylene-based resin foamed molded article with an extruder to obtain a mixture; an extrusion step of extruding the mixture obtained in the mixing step from the extruder and cutting the mixture to obtain polypropylene-based resin beads; and a foaming step of impregnating the polypropylene-based resin beads obtained in the extrusion step with a blowing agent and forming the polypropylene-based resin beads impregnated with the blowing agent to obtain polypropylene-based resin expanded beads, wherein in the mixture, a blending ratio of the polypropylene-based resin is 30 wt % or more and 90 wt % or less, and a blending ratio of the polypropylene-based resin recovered materials is 10 wt % or more and 70 wt % or less (herein, a total of the polypropylene-based resin and the polypropylene-based resin recovered materials is 100 wt %), the polypropylene-based resin recovered materials contains carbon black, and a content ratio of the carbon black in the polypropylene-based resin recovered materials is 0.5 wt % or more and 5 wt % or less, a melting point of the polypropylene-based resin recovered materials is 135° C. or higher and 160° C. or lower, a melt flow rate of the polypropylene-based resin recovered materials at 230° C. under a load of 2.16 kg is higher than a melt flow rate of the polypropylene-based resin at 230° C. under a load of 2.16 kg, and a difference between the melt flow rate of the polypropylene-based resin recovered materials and the melt flow rate of the polypropylene-based resin ((melt flow rate of polypropylene-based resin recovered materials)–(melt flow rate of polypropylene-based resin)) is 0.1 g/10 min or more and 12 g/10 min or less.

Advantageous Effects of Invention

The present invention provides a production method suitable for producing polypropylene-based resin expanded beads using a post-consumer recycled material of a polypropylene-based resin foamed molded article containing CB. By using the polypropylene-based resin expanded beads produced by the present invention, the post-consumer recycled material of the polypropylene-based resin foamed molded article containing CB can be effectively used, and a polypropylene-based resin expanded beads molded article excellent in appearance and physical properties can be provided.

BRIEF DESCRIPTION OF DRAWINGS

FIG. 1 is an example of a DSC curve obtained according to a plastic transition heat measurement method described in JIS K7121-1987 for obtaining a high-temperature peak heat quantity of expanded beads.

DESCRIPTION OF EMBODIMENTS

Hereinafter, a method for producing polypropylene-based resin expanded beads of the present invention will be described. Hereinafter, a post-consumer recycled material may be abbreviated as "PCR", carbon black as "CB", and a melt flow rate as "MFR". The method for producing polypropylene-based resin expanded beads of the present invention may be simply referred to as a production method of the present invention. In the following description, a preferable numerical range of the present invention may be appropriately indicated. In this case, a preferred range, a more preferred range, and a particularly preferred range regarding the upper limit and the lower limit of the numerical range can be determined from all combinations of the upper limit and the lower limit.

The production method of the present invention uses a polypropylene-based resin having a melt flow rate of 1 g/10 min or more and 15 g/10 min or less at 230° C. under a load of 2.16 kg, and a polypropylene-based resin recovered materials comprising of a recovered materials of a post-consumer recycled material of a polypropylene-based resin foamed molded article. The polypropylene-based resin used here is a material containing only a virgin resin as a polypropylene resin. Therefore, hereinafter, the polypropylene-based resin having an MFR in a predetermined range may be appropriately referred to as a virgin polypropylene-based resin. The present invention is a method for producing polypropylene-based resin expanded beads, the steps including: a mixing step of melt-mixing these materials with an extruder to obtain a mixture; an extrusion step of extruding the mixture obtained in the mixing step from the extruder and cutting the mixture to obtain polypropylene-based resin beads; and a foaming step of impregnating the polypropylene-based resin beads obtained in the extrusion step with a blowing agent and expanding the polypropylene-based resin beads impregnated with the blowing agent to obtain polypropylene-based resin expanded beads.

In the present invention, in the mixture obtained in the mixing step, a blending ratio of the virgin polypropylene-based resin is adjusted to 30 wt % or more and 90 wt % or less, and a blending ratio of the polypropylene-based resin recovered materials is adjusted to 10 wt % or more and 70 wt % or less (herein, a total of the virgin polypropylene-based resin and the polypropylene-based resin recovered materials is 100 wt %).

In the present invention, a polypropylene-based resin recovered materials containing carbon black in a predetermined range is used. In order to suitably use such a polypropylene-based resin recovered materials, in the present invention, a melting point of the polypropylene-based resin recovered materials is in a range of 135° C. or higher and 160° C. or lower, and a melt flow rate of the polypropylene-based resin recovered materials at 230° C. under a load of 2.16 kg is higher than a melt flow rate of the virgin polypropylene-based resin at 230° C. under a load of 2.16 kg. Then, in the present invention, a polypropylene-based resin recovered materials in which a difference between the melt flow rate of the polypropylene-based resin recovered materials and the melt flow rate of the virgin polypropylene-based resin ((melt flow rate of polypropylene-based resin recovered materials)–(melt flow rate of virgin polypropylene-based resin)) is 0.1 g/10 min or more and 12 g/10 min or less is used.

According to the production method of the present invention having the above configuration, it is possible to provide polypropylene-based resin expanded beads exhibiting good moldability equivalent to expanded beads produced using only a general virgin polypropylene-based resin as a resin material.

By using the polypropylene-based resin expanded beads produced by the production method of the present invention, an expanded beads molded article excellent in appearance and physical properties can be produced.

As described above, since a PCR can be effectively used, the present invention contributes to solving environmental problems such as reduction in carbon dioxide emission by material recycling and use of waste products required for a recycling-oriented society. In addition, the present invention is also meaningful in that the present invention made it possible to recycle a black polypropylene-based resin foamed molded article containing CB, which has been conventionally difficult to recycle. In addition, according to the present invention, it is possible to reduce the amount of CB to be newly used when providing black expanded beads using a recovered materials of a PCR of a polypropylene-based resin foamed molded article.

Furthermore, a used polypropylene-based resin foamed molded article to be used as a PCR may be stored outdoors exposed to sunlight including ultraviolet rays, and deterioration of the resin due to ultraviolet rays may be a problem. On the other hand, in a PCR of a polypropylene-based resin foamed molded article containing CB, deterioration of the resin due to the influence of ultraviolet rays during outdoor storage can be suppressed by an ultraviolet ray-shielding effect of the CB.

Meanwhile, as mentioned in Patent Literature 4 described above, the value of an MFR of an extruded resin is important as an index when a foamed molded article is produced. Such a value of the MFR is generally recognized as an index reflecting the molecular weight of the molecular chain of the resin. It is understood that, in the resin put in an extruder and melt-mixed, a part of the molecular chain of the resin is cut due to the influence of heat or shear in the extruder, and a low-molecular weight portion increases, thereby increasing the value of the MFR.

However, as a result of intensive studies by the present inventors, it has been inferred that the value of an MFR of a recovered materials of a PCR of a polypropylene-based resin foamed molded article containing CB changes not only under the influence of an increase in the low-molecular weight portion described above but also under the influence of an action of CB on the resin. Therefore, a conventional finding about use of a recovered materials of a PCR of a polypropylene-based resin foamed molded article not containing CB is difficult to be diverted to use of a recovered materials of a PCR of a polypropylene-based resin foamed molded article containing CB, and this has been considered to be a cause that the use of a recovered materials of a PCR of a polypropylene-based resin foamed molded article containing CB does not proceed.

Therefore, the present inventors have focused on a difference between an MFR of a recovered materials of a PCR of a polypropylene-based resin foamed molded article containing CB and an MFR of a virgin polypropylene-based resin when the recovered materials of a PCR of a polypropylene-based resin foamed molded article containing CB and the virgin polypropylene-based resin are blended to produce expanded beads. The present invention makes it possible to achieve the intended object by setting the difference within a predetermined range.

Hereinafter, the production method of the present invention will be described in more detail. In the following description, polypropylene-based resin expanded beads produced by the method for producing polypropylene-based resin expanded beads of the present invention may be simply referred to as expanded beads.

[Polypropylene-Based Resin]

In the production method of the present invention, a polypropylene-based resin (virgin polypropylene-based resin) is used together with the polypropylene-based resin recovered materials described later.

In the present invention, the virgin polypropylene-based resin is a resin material containing a polypropylene resin that is a virgin resin as a base material resin. The form of the virgin polypropylene-based resin is not particularly limited, but for example, the virgin polypropylene-based resin is handled as a particulate product granulated into a pellet form or the like. The virgin polypropylene-based resin may contain only a polypropylene resin that is substantially a virgin resin as a base material resin, and may contain a polymer material such as another resin other than the polypropylene resin or a thermoplastic elastomer, and an optional additive as long as the intended effect of the present invention is not impaired.

The polypropylene resin contained in the virgin polypropylene-based resin refers to a resin having a propylene component unit of 50 wt % or more in the resin, and examples thereof include a propylene homopolymer and a copolymer with another olefin copolymerizable with propylene. Examples of the other olefin copolymerizable with propylene include ethylene, and α-olefins having 4 or more carbon atoms such as 1-butene. The copolymer may be a random copolymer or a block copolymer, and may be a ternary copolymer as well as a binary copolymer. These polypropylene resins can be used singly or in combination of two or more kinds thereof.

Examples of the polymer material that can be appropriately contained in the polypropylene-based resin include other resins other than the polypropylene resins shown below. Examples of the other resins include ethylene-based resins such as high-density polyethylene, medium-density polyethylene, low-density polyethylene, linear low-density polyethylene, linear very-low-density polyethylene, an ethylene-vinyl acetate copolymer, an ethylene-acrylic acid copolymer, an ethylene-acrylic acid ester copolymer, an ethylene-methacrylic acid copolymer, and an ethylene-methacrylic acid ester copolymer; polystyrene-based resins such as polystyrene, impact-resistant polystyrene, and a styrene-acrylonitrile copolymer; acryl-based resins such as polymethyl methacrylate; and polyester-based resins such as polylactic acid and polyethylene terephthalate. These resins can be used singly or in combination of two or more kinds thereof.

As the polymer material, a thermoplastic elastomer such as an olefin-based elastomer such as an ethylene-hexene copolymer or an ethylene-propylene-diene copolymer, or a styrene-based elastomer such as a styrene-butadiene-styrene block copolymer, a styrene-isoprene-styrene block copolymer, or a hydrogenated product thereof can also be used. These thermoplastic elastomers can be used singly or in combination of two or more kinds thereof.

In the present invention, as the polymer material described above, any one of other resins and the thermoplastic elastomer, or a combination thereof can be used. The blending ratio of the polymer material in the virgin polypropylene-based resin is preferably 20 wt % or less, more preferably 10 wt % or less, and still more preferably 5 wt % or less.

(Melt Flow Rate)

The virgin polypropylene-based resin used in the present invention has an MFR of 1 g/10 min or more and 15 g/10 min or less at 230° C. under a load of 2.16 kg. When the MFR is within the above range, expandability and moldability of the resulting expanded beads are improved, and a good expanded beads molded article can be obtained. From such a viewpoint, the MFR of the virgin polypropylene-based resin is preferably 2 g/10 min or more, and more preferably 4 g/10 min or more. In addition, the MFR of the virgin polypropylene-based resin is preferably 10 g/10 min or less, and more preferably 8 g/10 min or less.

The MFR is measured under conditions of 230° C. under a load of 2.16 kg based on JIS K7210-1:2014.

(Melting Point)

The melting point of the virgin polypropylene-based resin described above is not limited. From the viewpoint of obtaining an expanded beads molded article excellent in tensile strength and 50% strain compressive strength, the melting point is preferably 140° C. or higher, and more preferably 145° C. or higher. From the viewpoint of obtaining expanded beads excellent in moldability, the melting point of the virgin polypropylene-based resin is preferably 160° C. or lower, and more preferably 155° C. or lower. The melting point is measured based on JIS K7121-1987. At this time, as condition adjustment of a test piece, "(2) Case where melting temperature is measured after constant heat treatment" in the above standard is adopted. More specifically, the peak top temperature of the melting peak determined by the DSC curve obtained when approximately 2 mg of a virgin polypropylene-based resin is used as a test piece, and based on a heat-flux differential scanning calorimetry described in JIS K7121-1987, the temperature is raised from 23° C. to 200° C. at a heating rate of 10° C./min, then lowered to 23° C. at a cooling rate of 10° C./min, and raised again from 23° C. to 200° C. at a heating rate of 10° C./min is defined as the melting point of the virgin polypropylene-based resin. When two or more melting peaks appear in the DSC curve, the peak top temperature of the melting peak having the largest area is defined as the melting point. Examples of the measuring apparatus include a heat-flux differential scanning calorimeter (manufactured by SII NanoTechnology Inc., model number: DSC7020).

The measurement of the MFR and the melting point described above is performed using the virgin polypropylene-based resin containing a resin that is virgin and a polymer material such as another resin other than the polypropylene resin or a thermoplastic elastomer optionally contained, an additive, and the like.

[Recovered Material of Post-Consumer Recycled Material]

In the production method of the present invention, a polypropylene-based resin recovered materials including a recovered materials of a post-consumer recycled material of a polypropylene-based resin foamed molded article is used together with the virgin polypropylene-based resin described above.

Regarding the present invention, the post-consumer recycled material (PCR) refers to a material that has been used as a product by a consumer. Specifically, the post-consumer recycled material is as defined in JIS Q14021: 2000. More specifically, the post-consumer recycled material refers to a material discharged from a household, or a material generated as a product that is no longer usable for its original purposes from commercial, industrial, and various facilities as end users of the product, or the like, including a material returned from a distribution channel. The recovered materials of the post-consumer recycled material refers to a materials obtained by recovering these used materials.

The polypropylene-based resin recovered materials is generally a recovered polypropylene-based resin obtained by recovering, crushing, and/or melting a used polypropylene-based resin foamed molded article to be pelletized. In the present invention, the manufacturer of the used polypropylene-based resin foamed molded article is not particularly limited, but for example, the manufacturer and the company that carries out the production method of the present invention are preferably the same. This is because, by recovering the company's own product as a PCR, the composition and the like of the PCR can be sufficiently grasped, and recycling of the company's own product can contribute to a recycling-oriented society.

The polypropylene-based resin recovered materials used in the present invention contains a polypropylene-based resin containing a polypropylene resin and CB. The polypropylene-based resin contained in the polypropylene-based resin recovered materials (hereinafter, also referred to as a recovered polypropylene-based resin) is different from the virgin polypropylene-based resin described above in that the recovered polypropylene-based resin is recovered from a used foamed molded article. Similarly to the virgin polypropylene-based resin, the recovered polypropylene-based resin contains a polypropylene resin, and may contain a polymer material such as another resin other than the polypropylene resin or a thermoplastic elastomer, or an optional additive as long as the intended effect of the present invention is not impaired. Since the type and the like of the polypropylene resin, the polymer material, and the additive that can be contained in the recovered polypropylene-based resin is the same as that of the virgin polypropylene-based resin described above, the detailed description thereof is omitted here.

The content ratio of the other resin and the thermoplastic elastomer in the polypropylene-based resin recovered materials is preferably in a range of about 10 wt % or less.

The used polypropylene-based resin foamed molded article recovered for preparing the polypropylene-based resin recovered materials may be an extruded foamed molded article using a polypropylene-based resin or a polypropylene-based resin expanded beads molded article, which is an in-mold molded article using polypropylene-based resin expanded beads. In particular, for formation of a recycling-oriented society, it is desired to establish a so-called horizontal recycling route that is used for production of a product from which a recovered materials of used waste is originated. In addition, it is easy to maintain product performance by returning to the original product. Since the present invention is a method for producing expanded beads, the polypropylene-based resin recovered materials preferably includes a recovered materials of a post-consumer recycled material of a polypropylene-based resin expanded beads molded article.

[Method for Preparing Recovered Materials]

The method for preparing the polypropylene-based resin recovered materials is not particularly limited, but it is preferable to consider reducing the number of thermal histories in a recovery step and a regeneration step. In addition, it is preferable to consider that the heating temperature in the recovery step and the regeneration step does not become excessively high.

More specifically, examples of the method for preparing the polypropylene-based resin recovered materials include the following methods.

(Collection and Crushing of Used Polypropylene-Based Resin Expanded Beads Molded Article, and Production of Melted Ingot)

In general, a polypropylene-based resin expanded beads molded article is bulky. Therefore, transportation in a product shape has a problem of poor transportation efficiency and high cost. For this reason, in order to recover a used polypropylene-based resin expanded beads molded article, it is desirable to install a production site for a polypropylene-based resin recovered materials near a place where a used polypropylene-based resin expanded beads molded article is generated by disassembling and separating used final products (such as a facility for disassembling and separating used final products). However, it is not economical to install a production site for a polypropylene-based resin recovered materials for each facility for disassembling and separating used final products because of increased capital investment. For this reason, it is preferable that a sorting/crushing/melting volume reduction apparatus is installed at or near a facility for disassembling and separating used final products, and a used resin expanded beads molded article is used as a volume-reduced mass (so-called melted ingot). Then, a method of transporting the volume-reduced mass to a production site of a polypropylene-based resin recovered materials is economical and preferable.

(Sorting)

Collected used polypropylene-based resin expanded beads molded article may contain an article other than the polypropylene-based resin expanded beads molded article, such as a packaging bag or a label, and thus it is preferable to sort foreign matters. The foreign matter sorting may be performed by visual sorting by an operator, or a sorting machine or the like may be used.

(Crushing, and Production of Melted Ingot)

It is preferable to use a crusher for crushing the collected used polypropylene-based resin expanded beads molded article. Examples of the crusher include a compression crusher, a shear crusher, and an impact crusher. A shear crusher is preferably used for a polypropylene-based resin expanded beads molded article having a high magnification. As the crushing method, for example, a molded article that has been coarsely crushed once using an impact crusher or the like may be finely crushed again using a shear crusher or the like, or may be crushed at a time using a shear crusher or the like. In particular, a method in which crushing is performed in one step while particle sizes of crushed articles are made uniform using a punching metal or a screen installed at an outlet of a shear crusher or the like is economical and preferable. The size of the crushed article is not particularly limited, but is preferably 1 mm or more and 30 mm or less.

The obtained crushed article is preferably heated and volume-reduced to form a melted ingot. Examples of the heating/volume-reducing machine include an extruder type and a press type. An extruder type is preferably used for a polypropylene-based resin expanded beads molded article having a high magnification. The treatment temperature at the time of volume reduction is not particularly limited, but it is preferable to perform treatment at a temperature as low as possible in order to avoid thermal deterioration of the polypropylene-based resin, and it is preferable to perform treatment at 220° C. or lower and the resin melting point or higher.

(Production of Polypropylene-Based Resin Recovered Materials)

It is preferable that the melted ingot is crushed again using the crusher described above or the like, melted using an extruder, and then pelletized to obtain polypropylene-based resin recovered materials pellets.

As the crusher, the same crusher as described above can be used.

As the extruder, a single-screw extruder, a twin-screw extruder, or the like can be used. From the viewpoint of preventing resin deterioration, a single-screw extruder is preferably used. The extruder temperature is not particularly limited, but it is preferable to perform treatment at a temperature as low as possible in order to avoid thermal deterioration of the polypropylene-based resin, and it is preferable to perform treatment at 220° C. or lower and the resin melting point or higher.

As described above, it is preferable that the polypropylene-based resin melted by the extruder is once passed through a filter to remove foreign matters. As the filter, woven wire mesh, sintered metal, or the like is used. It is economical and preferable to use woven wire mesh.

(Pelletization)

Examples of the pelletization of the melted polypropylene-based resin as described above include an underwater cutting method in which the melted resin is continuously cut by a rotary blade attached to the front surface of the die while being extruded from the die into water or mist and solidified, and a strand cutting method in which the melted resin is continuously extruded from the die in a strand shape, then cooled and solidified in a water tank, and then cut by a cutting machine. Among them, the strand cutting method is economical and preferable.

The size of the pellet is not particularly limited, but the pellet weight is preferably 1 to 30 mg.

Although the method for preparing the polypropylene-based resin recovered materials has been described above, a commercially available product marketed as a post-consumer recycled material may be used as the polypropylene-based resin recovered materials used in the production method of the present invention.

(Carbon Black)

The polypropylene-based resin recovered materials used in the present invention contains CB together with the recovered polypropylene-based resin.

CB is contained in a range of 0.5 wt % or more and 5 wt % or less in 100 wt % of the polypropylene-based resin recovered materials. If the content ratio of CB is too low, a new high amount of CB must be used to provide a good black foamed molded article. From such a viewpoint, the content ratio of CB in 100 wt % of the polypropylene-based resin recovered materials is preferably 1 wt % or more, and more preferably 1.5 wt % or more. On the other hand, expanded beads produced using a polypropylene-based resin recovered materials having an excessively high content ratio of CB may not be able to provide a foamed molded article excellent in appearance and tensile strength. From such a viewpoint, the content ratio of CB in 100 wt % of the polypropylene-based resin recovered materials is preferably 4 wt % or less, and more preferably 3 wt % or less.

(Method for Measuring Amount of Carbon Black)

The content of carbon black contained in the polypropylene-based resin recovered materials can be performed based on JIS K6226-2:2003. As the measuring apparatus, for example, a thermogravimetric analyzer TGA701 manufactured by LECO Corporation can be used. Specifically, about 5 g of a polypropylene-based resin recovered materials as a measurement sample is weighed and then collected and put in a crucible, the inside of a heating furnace is set to a nitrogen stream, and (1) heating is performed so that the temperature of the heating furnace is from room temperature to 105° C. at a heating rate of 10° C./min under a nitrogen atmosphere. Then, (2) the temperature is held at 105° C. until the measured weight reaches equilibrium. (3) Heating is performed at a heating rate of 10° C./min from 105° C. to 550° C. (4) Weight W1 of the combustion residue after holding at 550° C. until the measured weight reached equilibrium is determined. Furthermore, (5) the heating furnace stream is changed from nitrogen to air, and heating is performed from 550° C. to 950° C. at a heating rate of 10° C./min. (6) Weight W2 of the combustion residue after holding at 950° C. for 10 minutes is determined. By multiplying the value obtained by dividing weight W3 obtained by subtracting weight W2 from weight W1 by the weight of the measurement sample put in the crucible by 100, the content (wt %) of CB in 100 wt % of the polypropylene-based resin recovered materials can be obtained.

In the present invention, the CB may be a carbon material used as a black colorant, and examples thereof include channel black, roller black, furnace black, thermal black, acetylene black, and Ketjen black. Among them, furnace black is preferable as CB contained in the polypropylene-based resin recovered materials because it is excellent in the balance between dispersibility in the polypropylene-based resin and material cost.

(Melting Point)

The melting point of the polypropylene-based resin recovered materials used in the present invention is 135° C. or higher and 160° C. or lower. When the melting point is lower than 135° C., heat resistance may be poor. From such a viewpoint, the melting point of the polypropylene-based resin recovered materials is preferably 140° C. or higher, and more preferably 145° C. or higher. On the other hand, when the melting point is higher than 160° C., molding processability may be poor. From such a viewpoint, the melting point of the polypropylene-based resin recovered materials is preferably 155° C. or lower, and more preferably 153° C. or lower.

From the viewpoint of more satisfactorily solving the intended problems of the present invention, the difference between the melting point of the virgin polypropylene-based resin and the melting point of the polypropylene-based resin recovered materials ((melting point of virgin polypropylene-based resin)−(melting point of polypropylene-based resin recovered materials)) is preferably −10° C. or higher and +10° C. or lower, more preferably −5° C. or higher and +5° C. or lower, and still more preferably −3° C. or higher and +3° C. or lower.

The melting point of the polypropylene-based resin recovered materials can be measured based on JIS K7121-1987. At this time, as condition adjustment of a test piece, "(2) Case where melting temperature is measured after constant heat treatment" in the above standard is adopted. More specifically, approximately 2 mg of the polypropylene-based resin recovered materials as a test piece, and based on a heat-flux differential scanning calorimetry described in JIS K7121-1987, the temperature is raised from 23° C. to 200° C. at a heating rate of 10° C./min, and then lowered to 23° C. at a cooling rate of 10° C./min. The peak top temperature of the melting peak determined by the DSC curve obtained when the temperature is raised again from 23° C. to 200° C. at a heating rate of 10° C./min is defined as the melting point of the polypropylene-based resin recovered materials. When two or more melting peaks appear in the DSC curve, the peak top temperature of the melting peak having the largest area is defined as the melting point. Examples of the measuring apparatus include a heat-flux differential scanning calorimeter (manufactured by SII NanoTechnology Inc., model number: DSC7020). The measurement of the melting point of the polypropylene-based resin recovered materials is measured using the polypropylene-based resin recovered materials containing carbon black as a test piece.

(Melt Flow Rate)

The melt flow rate value of the polypropylene-based resin recovered materials used in the present invention at 230° C. under a load of 2.16 kg is preferably 3 g/10 min or more, more preferably 5 g/10 min or more, and still more preferably 7 g/10 min or more. On the other hand, the melt flow rate value of the polypropylene-based resin recovered materials at 230° C. under a load of 2.16 kg is preferably 20 g/10 min or less, and more preferably 10 g/10 min or less. The fact that the melt flow rate value of the polypropylene-based resin recovered materials is small means that the resin constituting the polypropylene-based resin recovered materials is not excessively deteriorated. In order to maintain a small melt flow rate value of the polypropylene-based resin recovered materials, it is preferable to perform production so that heat or shear is not excessively applied. The MFR is measured based on JIS K7210-1:2014.

In the present invention, it is important that the value of the MFR of the polypropylene-based resin recovered materials is higher than the MFR of the virgin polypropylene-based resin at 230° C. under a load of 2.16 kg, and that the difference between the MFR of the polypropylene-based resin recovered materials and the MFR of the virgin polypropylene-based resin (MFR of polypropylene-based resin recovered materials)−(MFR of virgin polypropylene-based resin) is 0.1 g/10 min or more and 12 g/10 min or less. That is, it is more important to adjust the difference between the MFR of the polypropylene-based resin recovered materials and the MFR of the virgin polypropylene-based resin to fall within the above range than whether the value of the MFR of the polypropylene-based resin recovered materials itself is high or low. By adjusting the difference of the MFR to the above range, polypropylene-based resin expanded beads having good moldability can be produced. In addition, by using the polypropylene-based resin expanded beads, it is possible to provide an expanded beads molded article excellent in appearance and physical properties by utilizing a recycled material. In the present invention, the polypropylene-based resin recovered materials contains carbon black. The present invention has found that it is important that the relationship between the MFR of the polypropylene-based resin recovered materials containing carbon black and the MFR of the virgin polypropylene-based resin satisfies the above range in order to obtain an expanded beads molded article excellent in appearance and physical properties while utilizing a recycled material. From such a viewpoint, the difference between the MFR of the polypropylene-based resin recovered materials and the MFR of the virgin polypropylene-based resin ((MFR of polypropylene-based resin recovered materials)−(MFR of virgin polypropylene-based resin)) is preferably 0.5 g/10 min or more, more preferably 1 g/10 min or more, and still more preferably 2 g/10 min or more. In addition, the difference between the MFR of the polypropylene-based resin recovered materials and the MFR of the virgin polypropylene-based resin ((MFR of polypropylene-based resin recovered materials)−(MFR of virgin polypropylene-based resin)) is preferably 10 g/10 min or less, more preferably 7 g/10 min or less, and still more preferably 4 g/10 min or less.

The measurement of the melting point and the MFR of the polypropylene-based resin recovered materials described above is performed using a polypropylene-based resin recovered materials containing a recovered polypropylene-based resin containing a polypropylene resin, CB, and a polymer material such as another resin other than the polypropylene resin or a thermoplastic elastomer optionally contained, and an additive.

(Ash Content)

Generally, the post-consumer recycled material is different from a recycled material recovered in a production step, and is greatly contaminated and deteriorated due to a use environment, and is greatly changed in quality due to storage conditions and regeneration treatment after recovery. Due to such uncertain factors, expanded beads molded article produced using a PCR of a polypropylene-based resin foamed molded article may not have stable appearance and physical properties such as tensile strength and compressive strength. Therefore, from the viewpoint of ensuring the stability of the quality of the expanded beads molded article, the ash content of the polypropylene-based resin recovered materials used as a material may be used as an index. Specifically, the ash content of the polypropylene-based resin recovered materials used in the production method of the present invention is preferably 10,000 ppm by weight or less, and more preferably 5000 ppm by weight or less. When the ash content obtained by the measurement method described later is small, it can be determined that the degree of contamination of the polypropylene-based resin recovered materials is low and quality change is also small.

Method for measuring ash content:

Examples of the ash of the polypropylene-based resin recovered materials include calcium, sodium, and silicon.

Such an ash content can be measured based on JIS K6226-2:2003. As the measuring apparatus, for example, a thermogravimetric analyzer TGA701 manufactured by LECO Corporation can be used. Specifically, about 5 g of a polypropylene-based resin recovered materials as a measurement sample is collected and weighed and then put in a crucible, the inside of a heating furnace is set to a nitrogen stream, (1) heating is performed so that the temperature of the heating furnace is from room temperature to 105° C. at a heating rate of 10° C./min under a nitrogen atmosphere, then, (2) the temperature is held at 105° C. until the measured weight reaches equilibrium, (3) heating is performed at a heating rate of 10° C./min from 105° C. to 550° C., (4) the temperature is held at 550° C. until the measured weight reaches equilibrium, (5) the heating furnace stream is replaced from nitrogen to air, and heating is performed from 550° C. to 950° C. at a heating rate of 10° C./min, (6) weight W1 of the combustion residue after holding at 950° C. for 10 minutes is determined, and (7) the temperature is cooled to room temperature. The value (wt %) obtained by multiplying the value obtained by dividing weight W1 of the combustion residue by the weight (5 g) of the measurement sample put in the crucible by 100 is multiplied by 10,000 to obtain the ash content (ppm by weight) of the recovered materials.

(Other Additives)

The polypropylene-based resin recovered materials may contain an additive appropriately added in production of a polypropylene-based resin foamed molded article, in addition to the recovered polypropylene-based resin and carbon black described above. In order to recycle a used expanded beads molded article, it may be difficult to grasp all the components contained, but when the ash content of the polypropylene-based resin recovered materials satisfies the above range, the expanded beads molded article can be suitably used as a PCR.

[Additive]

For the mixture obtained by the mixing step, one or two or more additives may be further used together with the virgin polypropylene-based resin and the polypropylene-based resin recovered materials described above as long as the intended effect of the present invention is not impaired. Examples of the additive include, but are not limited to, a colorant such as CB, a nucleating agent such as boric acid, an antioxidant, an ultraviolet inhibitor, a lubricant, and a cell controlling agent. The blending ratio of the additive may be appropriately determined with reference to a conventionally known method for producing polypropylene-based resin expanded beads.

In order for expanded beads produced by the production method of the present invention or an expanded beads molded article produced using the expanded beads to exhibit good black, it is preferable to use CB as the additive used together with the virgin polypropylene-based resin and the polypropylene-based resin recovered materials. The blending ratio of such CB can be adjusted in consideration of the content of CB contained in the polypropylene-based resin recovered materials described above, the blending ratio of the virgin polypropylene-based resin and the polypropylene-based resin recovered materials, and the like. The blending ratio of the CB in the mixture is preferably 0.5 wt % or more, and more preferably 1 wt % or more. In addition, the blending ratio of the CB is preferably 5 wt % or less, and more preferably 3 wt % or less.

[Configuration of Expanded Beads]

The expanded beads produced by the production method of the present invention may be single-layer beads or multilayer resin expanded beads having a covering layer made of a polyolefin-based resin on a surface of the beads. The covering layer can have the same configuration as that of a covering layer in conventionally known multilayer resin expanded beads.

For example, when a polyolefin-based resin is used as the resin constituting the covering layer, the polyolefin-based resin contains a polyolefin resin, a polymer material such as another resin or a thermoplastic elastomer appropriately contained, and an optional additive. Examples of the polyolefin resin include, but are not limited to, a polypropylene resin or a copolymer of a polypropylene-based resin and another resin, and a polyethylene-based resin or a copolymer of a polyethylene-based resin and another resin. The resin constituting the covering layer may contain the polypropylene-based resin recovered materials. The blending ratio of the polypropylene-based resin recovered materials in the polyolefin-based resin constituting the covering layer is preferably smaller than that of the polypropylene-based resin recovered materials contained in the resin constituting the core layer. From the viewpoint of easily obtaining an expanded beads molded article excellent in fusion-bonding properties between expanded beads, secondary expandability, and tensile strength, it is preferable that the resin constituting the covering layer does not contain the polypropylene-based resin recovered materials.

The melting point of the polyolefin-based resin constituting the covering layer is not particularly limited, but is preferably a temperature lower than the melting point or softening point of the core layer-constituting material constituting the core layer. As a result, when, using the expanded beads produced by the production method of the present invention, the core layer of the expanded beads is heated to a temperature that enables secondary expansion and subjected to in-mold molding, the covering layer is melted before the core layer, so that the fusion-bonding properties between adjacent expanded beads become good.

The melting point and softening point of the polypropylene constituting the core layer described above refer to a melting point and softening point of a mixture including a virgin polypropylene-based resin and a polypropylene-based resin recovered materials. More specifically, in carrying out the production method of the present invention, a mixture having the same blending ratio as that of the virgin polypropylene-based resin and polypropylene-based resin recovered materials used at a predetermined ratio is adjusted, and this mixture can be used as a sample for a melting point or a softening point.

The MFR of the polyolefin-based resin constituting the covering layer at 230° C. under a load of 2.16 kg is not particularly limited, but is preferably 1 g/10 min or more, and more preferably 2 g/10 min or more. On the other hand, the MFR of the polyolefin-based resin constituting the covering layer at 230° C. under a load of 2.16 kg is preferably 15 g/10 min or less, and more preferably 8 g/10 min or less. The MFR is measured under conditions of 230° C. under a load of 2.16 kg based on JIS K7210-1:2014.

For the covering layer described above, one or two or more additives may be used as long as the intended effect of the present invention is not impaired. As the additive, the same additive as that added to the mixture can be used. The blending ratio of the additive may be appropriately determined with reference to a conventionally known method for producing polypropylene-based resin expanded beads.

It is preferable to blend CB in addition to the polyolefin-based resin in the covering layer described above. As a result, multilayer resin expanded beads exhibiting good black can be produced. The blending ratio of CB in total 100 wt % of the resin constituting the covering layer and the CB blended in the covering layer is preferably 0.5 wt % or more, and more preferably 2 wt % or more. The blending ratio of CB in total 100 wt % of the resin constituting the covering layer and the CB blended in the covering layer is preferably 5 wt % or less, and more preferably 4 wt % or less.

The weight ratio between the core layer and the covering layer is not particularly limited, but from the viewpoint of blending a large amount of a core layer containing a recovered materials of a post-consumer recycled material, the covering layer is preferably 20 parts by weight or less, more preferably 10 parts by weight or less, and still more preferably 5 parts by weight or less with respect to 100 parts by weight of the core layer. The lower limit of the covering layer with respect to 100 parts by weight of the core layer is about 1 part by weight. Expanded beads in which the weight ratio between the core layer and the covering layer satisfies the above range are preferable because an expanded beads molded article excellent in fusion-bonding properties between the expanded beads is easily obtained.

The covering layer may be in an expanded state or a non-expanded state, but is preferably a resin layer in a substantially non-expanded state in order to make the resulting expanded beads molded article excellent in mechanical strength. It is to be noted that the term "substantially non-expanded state" as used herein includes not only a state in which there are no cells at all (also including a state in which cells once formed at the time of expanding resin beads are melted and broken to eliminate the cells), but also a state in which very small cells are slightly present within a range that does not affect the mechanical strength of the resulting expanded beads molded article.

In the multilayer resin expanded beads, the core layer may be completely covered with the covering layer, or a part of the core layer may be exposed. Examples of the structure in which the core layer is exposed include a structure in which only the side surface of a cylindrical core layer is covered with the covering layer, and the core layer is exposed on the upper surface or the bottom surface of the cylinder.

Hereinafter, each step in the production method of the present invention will be described. The production method of the present invention includes a mixing step, an extrusion step, and a foaming step, and a different step may be further added as long as the intended effect of the present invention is not impaired. In addition, each step may be performed independently of each other, or some or all of the steps may overlap each other.

[Mixing Step]

In the production method of the present invention, first, a mixing step is performed. The mixing step is a step of supplying a virgin polypropylene-based resin containing a resin that is virgin, a polypropylene-based resin recovered materials comprising of a recovered materials of a post-consumer recycled material of a polypropylene-based resin foamed molded article, and an additive to be appropriately used to an extruder, melting and kneading the supplied material to obtain a mixture thereof.

The blending ratio of the virgin polypropylene-based resin in the mixture is adjusted to 30 wt % or more and 90 wt % or less, and the blending ratio of the polypropylene-based resin recovered materials is adjusted to 10 wt % or more and 70 wt % or less. Herein, the total of the virgin polypropylene-based resin and the polypropylene-based resin recovered materials is 100 wt %.

From the viewpoint of sufficiently utilizing the polypropylene-based resin recovered materials and further improving the moldability of the resulting expanded beads, it is preferable that the blending ratio of the virgin polypropylene-based resin in the mixture is 50 wt % or more and 80 wt % or less and the blending ratio of the polypropylene-based resin recovered materials is 20 wt % or more and 50 wt % or less. Also in this case, the total of the virgin polypropylene-based resin and the polypropylene-based resin recovered materials is 100 wt %.

The mixture may contain a polymer material other than the virgin polypropylene-based resin and the polypropylene-based resin recovered materials as long as the effect of the present invention is not impaired. As the polymer material, the same polymer material that can be appropriately contained in the virgin polypropylene-based resin can be used. As the polymer material, any one of other resins and the thermoplastic elastomer, or a combination thereof can be used. When the polymer material is contained, the total content of the polymer material is preferably 10 wt % or less, more preferably 5 wt % or less, and still more preferably 3 wt % or less in 100 wt % of the mixture (total of virgin polypropylene-based resin, polypropylene-based resin recovered materials, and polymer materials other than these).

When multilayer resin expanded beads are produced by the production method of the present invention, a mixing step of preparing a core layer-constituting material constituting a core layer and a mixing step of preparing a covering layer-constituting material constituting a covering layer may be performed independently.

[Extrusion Step]

Next, an extrusion step of extruding the mixture obtained in the mixing step described above from an extruder and cutting the mixture to obtain polypropylene-based resin beads is performed.

Specifically, for example, the mixture is extruded from an extrusion die provided on the downstream side of the extruder to form a strand. Next, the strand is cut into a desired size by a pelletizer or the like, thereby obtaining polypropylene-based resin beads (hereinafter, also simply referred to as resin beads). The shape of the cross section of the strand orthogonal to the extrusion direction is circular or the like. The resin beads thus obtained has, for example, a columnar shape such as a cylindrical shape.

In the case of producing multilayer resin expanded beads having a multilayer structure provided with a covering layer, an extrusion apparatus for co-extrusion may be used. Specifically, a mixture as a core layer-constituting material and a covering layer-constituting material constituting a covering layer are joined in a co-extrusion die provided on the downstream side of the extruder, and the covering layer-constituting material is laminated on the outer periphery of the mixture and co-extruded to form a strand having a multilayer structure. Next, in the same manner as described above, the strand is cut into a desired size, thereby obtaining resin beads having a multilayer structure including a core layer made of a mixture and a covering layer covering the core layer.

[Foaming Step]

Next, a foaming step of impregnating the resin beads obtained in the extrusion step with a blowing agent and foaming the resin beads impregnated with the blowing agent to obtain polypropylene-based resin expanded beads is performed. The foaming step preferably includes a dispersion step, a blowing agent impregnation step, and a release step described later.

(Dispersion Step)

The dispersion step is a step of dispersing the resin beads obtained in the extrusion step in an aqueous medium contained in a vessel. The aqueous medium contains an inorganic dispersant. In addition, the aqueous medium may appropriately contain an optional additive other than the inorganic dispersant.

Aqueous medium:

The aqueous medium is a medium for dispersing resin beads in a vessel. Examples of the aqueous medium include water, alcohols, glycols, and glycerin, and among them, water is preferable from the viewpoint of ease of wastewater treatment and the like. From the viewpoint of improving dispersibility of resin beads and productivity of expanded beads, the addition amount of resin beads to an aqueous medium is preferably 10 parts by weight or more and 100 parts by weight or less, and more preferably 20 parts by weight or more and 80 parts by weight or less with respect to 100 parts by weight of the aqueous medium.

Inorganic dispersant

The inorganic dispersant is used for satisfactorily dispersing resin beads in an aqueous medium and suppressing blocking between expanded beads during the foaming step.

From the viewpoint of easily suppressing fusion bonding between expanded beads in the release step described later while maintaining in-mold moldability of the expanded beads, the addition amount of the inorganic dispersant is preferably 0.01 parts by weight or more and 2 parts by weight or less, more preferably 0.02 parts by weight or more and 1 part by weight or less, and still more preferably 0.03 parts by weight or more and 0.8 parts by weight or less with respect to 100 parts by weight of resin beads.

As the inorganic dispersant, for example, inorganic fine particles such as aluminum oxide, calcium tertiary phosphate, magnesium pyrophosphate, zinc oxide, kaolin, and mica can be used. These inorganic fine particles may be used singly, or two or more kinds thereof may be used in combination.

Optional additive

The aqueous medium may further contain one or more optional additives such as a dispersion auxiliary agent and a surfactant in addition to the inorganic dispersant. Examples of the dispersion auxiliary agent include aluminum sulfate. Examples of the surfactant include anionic surfactants such as sodium alkylbenzene sulfonate, sodium dodecylbenzene sulfonate, and sodium alkanesulfonate. The surfactant may be used singly, or two or more kinds thereof may be used in combination. These additives are usually added in a range of 0.01 parts by weight or more and 1 part by weight or less with respect to 100 parts by weight of resin beads.

(Blowing Agent Impregnation Step)

A blowing agent impregnation step is performed after the dispersion step described above is performed or at a timing overlapping with a part or whole of the dispersion step.

The blowing agent impregnation step is a step of impregnating resin beads dispersed in an aqueous medium with a blowing agent, which is performed in a general method for producing expanded beads. For example, a sealed vessel containing resin beads is sealed, and a physical blowing agent is added into the sealed vessel. As a result, the resin beads can be impregnated with the physical blowing agent to obtain expandable resin beads.

The addition of the physical blowing agent into the sealed vessel may be performed at any timing before the resin beads are expanded. A blowing agent in a solid state or a liquid state may be added to an aqueous medium together with resin beads at the time of the dispersion step, and then the resin beads may be impregnated with the blowing agent in a gaseous state by heating or the like. In parallel with the dispersion step, or after the end of the dispersion step, a blowing agent which is a gas may be injected into a sealed vessel to impregnate resin beads with the blowing agent.

Blowing agent:

The blowing agent used in the present invention is appropriately selected from among blowing agents used for obtaining general expanded beads, and a physical blowing agent is preferable.

As a specific example of the physical blowing agent, an inorganic physical blowing agent and/or an organic physical blowing agent can be used. Examples of the inorganic physical blowing agent include carbon dioxide, air, nitrogen, helium, argon, and water. Examples of the organic physical blowing agent include aliphatic hydrocarbons such as propane, butane, and hexane; alicyclic hydrocarbons such as cyclopentane and cyclohexane; and halogenated hydrocarbons such as methyl chloride, ethyl chloride, methylene chloride, 2,3,3,3-tetrafluoropropene, 1,3,3,3-tetrafluoropropene, 1-chloro-3,3,3-trifluoropropene, 1-chloro-2,3,3,3-tetrafluoropropene, and 1,1,1,4,4,4-hexafluoro-2-butene.

These physical blowing agents may be used singly or in combination of two or more kinds thereof. Among these blowing agents, a blowing agent containing an inorganic physical blowing agent such as carbon dioxide, nitrogen, or air as a main component is preferably used, and carbon dioxide is more preferably used. In the present invention, containing the inorganic physical blowing agent as a main component means that the physical blowing agent contains 50 mol % or more of the inorganic physical blowing agent. The physical blowing agent preferably contains the inorganic physical blowing agent in an amount of 70 mol % or more, more preferably 90 mol % or more, and the physical blowing agent is further preferably composed only of the inorganic physical blowing agent.

The addition amount of the physical blowing agent is appropriately determined according to the type of the base material resin constituting resin beads, the type of the blowing agent, the bulk density of the intended expanded beads, and the like. For example, when carbon dioxide is used as the physical blowing agent, the addition amount of carbon dioxide is preferably 0.1 parts by weight or more and 30 parts by weight or less, more preferably 0.5 parts by weight or more and 15 parts by weight or less, and still more preferably 1 part by weight or more and 10 parts by weight or less with respect to 100 parts by weight of resin beads.

High-temperature peak:

In addition, in order to adjust the crystalline state of the resulting expanded beads, in the dispersion step and/or the blowing agent impregnation step described above, adjustment may be performed such as adjustment of a heating rate of a sealed vessel, or holding a sealed vessel at a predetermined temperature for a predetermined time. For example, it is possible to perform adjustment in the DSC curve obtained by heat-flux differential scanning calorimetry such that a melting peak (high-temperature peak) appears on a higher-temperature side than a melting peak intrinsic to a resin constituting the resulting expanded beads (intrinsic peak).

Expanded beads exhibiting a high-temperature peak are preferable from the viewpoint that the range of molding conditions in which a good expanded beads molded article can be obtained is wider. The adjustment for obtaining the high-temperature peak described above can be performed, for example, as follows. In the dispersion step and/or the blowing agent impregnation step described above, a single-stage holding step of holding at a temperature of (resin melting point of resin beads—20° C.) or higher and lower than (end temperature of melting of resin beads) for about 10 to 60 minutes is performed. Thereafter, the temperature is adjusted to a temperature of (resin melting point of resin beads—15° C.) or higher and lower than (end temperature of melting of resin beads). Then, if necessary, a two-stage holding step of further holding at that temperature for about 10 to 60 minutes is performed. Subsequently, by performing a release step described later, expanded beads having a high-temperature peak can be produced. When two or more melting peaks of resin beads appear, the peak top temperature of the melting peak having the largest area is defined as the resin melting point of the resin beads. The holding within the range of (resin melting point of resin beads—15° C.) or higher and lower than (end temperature of melting of resin beads) for forming a high-temperature peak can be set in multiple stages within the temperature range, or the temperature can be slowly raised within the temperature range over a sufficient time. It is also possible to form the high-temperature peak by holding the temperature in this manner. Regarding the resin melting point of resin beads, the peak top temperature of the melting peak determined by the DSC curve is defined as the resin melting point of the resin beads; the DSC curve is obtained when resin beads are used as a test piece, and based on a heat-flux differential scanning calorimetry described in JIS K7121-1987, the temperature is raised from 23° C. to 200° C. at a heating rate of 10° C./min and then is lowered to 23° C. at a cooling rate of 10° C./min, and raised again from 23° C. to 200° C. at a heating rate of 10° C./min. When two or more melting peaks appear in the DSC curve, the peak top temperature of the melting peak having the largest area is defined as the resin melting point. In addition, regarding the end temperature of melting of resin beads, the end temperature of the melting peak obtained by the second heating in the measurement of the resin melting point of the resin beads is defined as the end temperature of melting of the resin beads.

(Release Step)

After the expandable resin beads are obtained in the blowing agent impregnation step described above, a release step is performed.

The release step is a step of releasing the expandable resin beads from the vessel together with the aqueous medium and foaming the expandable resin beads to obtain expanded beads. More specifically, the expandable resin beads are foamed by releasing the expandable resin beads together with the aqueous medium under a pressure lower than the internal pressure of the sealed vessel. Such a foaming method is preferable because expanded beads having a low bulk density can be easily obtained.

(Two-Stage Foaming Step)

The bulk density of the expanded beads produced as described above can be adjusted, for example, by appropriately changing foaming conditions such as temperature and pressure in the sealed vessel when the contents of the sealed vessel are released in the release step.

When expanded beads having a lower bulk density are desired, a step of expanding expanded beads in multiple stages as in the following two-stage foaming step may be performed. In the two-stage foaming step, first, the expanded beads obtained as described above are stored in a pressurizable sealed vessel, and a gas such as air is injected into the sealed vessel to perform a pressurization treatment to increase the internal pressure of the cells of the expanded beads. Thereafter, the expanded beads are taken out from the sealed vessel and heated using steam or hot air to further expand the expanded beads, thereby performing the two-stage foaming step. By performing such a two-stage foaming step, it is possible to obtain expanded beads (two-stage expanded beads) having a lower bulk density.

(Modification of Method for Producing Multilayer Resin Expanded Beads)

In the above description, the method for performing co-extrusion in the extrusion step in order to produce multilayer resin expanded beads has been described. However, in the present invention, the method for producing multilayer resin expanded beads is not limited thereto.

For example, as a different method for producing multilayer resin expanded beads, a mixture as a core layer-constituting material is obtained by a mixing step, and this is subjected to an extrusion step to prepare single-layer core layer beads formed in a particulate form in advance. Then, this is put into a mixing apparatus having a mixing function and a heating function to heat the surface layer portion of the core layer beads. Next, a polyolefin-based resin for constituting a covering layer is charged into the mixing apparatus or the like, and the heated core layer beads and the polyolefin-based resin are mixed to cover the surface of the core layer beads with the polyolefin-based resin composition, thereby obtaining multilayer resin beads including a covering layer. The multilayer resin beads are subjected to a foaming step and expanded to obtain multilayer resin expanded beads.

[Polypropylene-Based Resin Expanded Beads]

The polypropylene-based resin expanded beads produced as described above contain a polypropylene-based resin recovered materials including a recovered materials of a post-consumer recycled material of a polypropylene-based resin foamed molded article, and contribute to solving environmental problems such as reduction in carbon dioxide emission by material recycling and use of waste products required for a recycling-oriented society. The expanded beads produced by the present invention can exhibit good moldability equivalent to that of conventional expanded beads produced using only a virgin polypropylene-based resin, and can provide an expanded beads molded article excellent in appearance and physical properties. Hereinafter, the expanded beads produced by the production method of the present invention will be described.

(Content of CB)

The expanded beads contain at least CB contained in the polypropylene-based resin recovered materials. From the viewpoint of providing preferable black expanded beads or a black foamed molded article, the content ratio of CB in the expanded beads is preferably 0.5 wt % or more, and more preferably 1 wt % or more. On the other hand, from the viewpoint of obtaining expanded beads excellent in expandability and from the viewpoint of obtaining an expanded beads molded article excellent in moldability, the content ratio of CB in the expanded beads is preferably 5 wt % or less, and more preferably 4 wt % or less. The content ratio of CB in the expanded beads can be regarded as being equal to the content ratio of CB in the resin beads used for producing the expanded beads. Therefore, the content of CB contained in the expanded beads can be determined by considering the blending ratio of each resin to the blending ratio (content ratio) of CB blended in the production process and the content ratio of CB contained in the polypropylene-based resin recovered materials. Alternatively, as in the method for measuring the content of carbon black contained in a polypropylene-based resin recovered materials, the content of CB can also be determined by measuring the content of CB contained in the expanded beads based on JIS K6226-2:2003.

(Bulk Density)

The bulk density of the expanded beads related to the present invention is not particularly limited, but is preferably 100 kg/m$^3$ or less, more preferably 50 kg/m$^3$ or less, and still more preferably 30 kg/m$^3$ or less from the viewpoint of obtaining an expanded beads molded article excellent in lightweight properties and cushioning properties. On the other hand, from the viewpoint of obtaining an expanded beads molded article excellent in mechanical strength, the bulk density is preferably 10 kg/m$^3$ or more, more preferably 15 kg/m$^3$ or more, and still more preferably 20 kg/m$^3$ or more.

The bulk density of the expanded beads is measured by the following method. First, the expanded beads to be measured are allowed to stand for 24 hours or more in an environment of an air temperature of 23° C., a relative humidity of 50%, and 1 atm. The expanded beads group thus obtained having weight W (g) is filled in a measuring cylinder, and by lightly tapping the floor surface several times with the bottom surface of the measuring cylinder, the filling height of the expanded beads group in the measuring cylinder is stabilized. Bulk volume V (L) of the expanded beads group indicated by the scale of the measuring cylinder is read, and weight W of the expanded beads group is divided by bulk volume V of the expanded beads group (W/V). By converting the value thus obtained into a unit of kg/m$^3$, the bulk density (kg/m$^3$) of the expanded beads can be obtained.

(High-Temperature Peak)

Regarding the expanded beads, it is preferable that a melting peak intrinsic to the resin and a melting peak on a high-temperature side (high-temperature peak) due to secondary crystals of the resin formed by a thermal history until resin beads are expanded to obtain expanded beads are measured by heat-flux differential scanning calorimetry.

That is, preferred are expanded beads in which two or more melting peaks appear in a first DSC curve measured when expanded beads are used as a test piece and heated and melted at a heating rate of 10° C./min from 30° C. to an end temperature of heating that is 30° C. higher than a temperature at the end of a melting peak based on a heat-flux differential scanning calorimetry in JIS K7121-1987; the two or more melting peaks include a melting peak intrinsic to a resin constituting the expanded beads (intrinsic peak) and a melting peak on a high-temperature side (high-temperature peak) having a peak top temperature on a higher-temperature side than a peak top temperature of the melting peak intrinsic to the resin; and the melting peak on the high-temperature side does not appear in a second DSC curve measured when the test piece is then kept at the end temperature of heating for 10 minutes, then cooled to 30° C. at a cooling rate of 10° C./min, and heated and melted again at a heating rate of 10° C./min to an end temperature of heating that is 30° C. higher than a temperature at the end of a melting peak.

The expanded beads used as the test piece may be about 1 to 3 mg. When an expanded bead is larger than 3 mg, the expanded bead may be equally divided to be used as a 1 to 3 mg test piece. The expanded beads in which a high-temperature peak is confirmed as described above are excellent in in-mold moldability, and mechanical physical properties such as compressive strength and tensile strength of the resulting expanded beads molded article are improved.

The term "resin constituting the expanded beads" mentioned above refers to the polypropylene resin contained in the virgin polypropylene resin used as a material and the polypropylene-based resin recovered materials.

(Cell Diameter)

The cell diameter of the expanded beads obtained by the production method of the present invention is not particularly limited, but the average cell diameter of the expanded beads is preferably 50 μm or more, and more preferably 100 μm or more. On the other hand, the average cell diameter of the expanded beads is preferably 300 μm or less, and more preferably 200 μm or less. When the average cell diameter of the expanded beads satisfies the above range, in-mold moldability is excellent, and the obtained expanded beads molded article has excellent dimensional recoverability after molding and excellent mechanical strength such as compression properties, which is preferable. The average cell diameter of the expanded beads can be determined as follows based on an enlarged photograph obtained by photographing with a microscope a cross section obtained by substantially bisecting the expanded beads. First, in the enlarged photograph of the cross section of the expanded beads, four line segments passing through substantially the center of the cross section of the expanded beads are drawn from one surface to the other surface of the expanded beads. However, the line segment is drawn so as to form radial straight lines extending in eight directions at equal intervals from substantially the center of the cross section of the expanded beads to the surface of the cut beads. Next, total number N (pieces) of cells intersecting the four line segments is obtained. Sum L (μm) of the lengths of the four line segments is determined, and the value (L/N) obtained by dividing sum L by total number N is defined as the average cell diameter of one expanded bead. This operation is performed on 10 or more expanded beads, and the value obtained by arithmetically averaging the average cell diameters of the expanded beads is defined as the average cell diameter of the expanded beads.

[Expanded Beads Molded Article]

By in-mold molding using the expanded beads obtained by the production method of the present invention, an expanded beads molded article can be obtained. For example, the expanded beads molded article is produced as follows. First, expanded beads are filled in a mold having a cavity corresponding to a shape of a desired expanded beads molded article, and the expanded beads filled in the mold are heated by a heating medium such as steam. The expanded beads in the cavity are further expanded by heating and are fusion-bonded to each other. As a result, the expanded beads are integrated with each other, and an expanded beads molded article according to the shape of the cavity is obtained.

The expanded beads molded article produced using the expanded beads has few voids (gaps between beads) in surface appearance, occurrence of color unevenness is suppressed, appearance is excellent, and physical properties such as tensile strength and compressive stress at 50% strain are excellent.

(Density of Molded Article)

The density of the expanded beads molded article is not particularly limited, but is preferably 100 kg/m$^3$ or less, and more preferably 50 kg/m$^3$ or less from the viewpoint of lightweight properties. On the other hand, from the viewpoint of obtaining a molded article excellent in mechanical physical properties, the density is preferably 10 kg/m$^3$ or more, and more preferably 30 kg/m$^3$ or more.

The density of the molded article is determined by measuring the weight of the expanded beads molded article and dividing the weight by the volume of the expanded beads molded article determined by a submersion method.

(Tensile Strength)

The tensile strength of the expanded beads molded article is not particularly limited, but is preferably 500 kPa or more, and more preferably 600 kPa or more from the viewpoint of obtaining an expanded beads molded article that is excellent in tensile strength and is less likely to break. On the other hand, the upper limit of the tensile strength of the expanded beads molded article is about 1000 kPa.

The tensile strength of the expanded beads molded article can be determined based on a tensile test method described in JIS K6767:1999. A plate-shaped piece having a thickness of 10 mm is cut out from the central portion of the expanded beads molded article so as not to include the skin layer, and then punched into a dumbbell-shaped No. 1 shape using a pressing machine to prepare a test piece. This test piece is tested at a test rate of 500 mm/min using an autograph for tensile test (Autograph AGS-X universal tester manufactured by Shimadzu Corporation), and the tensile strength is determined.

(Compressive Stress at 50% Strain)

The compressive stress at 50% strain of the expanded beads molded article is not particularly limited, but is preferably 200 kPa or more and more preferably 250 kPa or more from the viewpoint of obtaining an expanded beads molded article excellent in compression properties. On the other hand, the upper limit of the compressive stress at 50% strain of the expanded beads molded article is about 500 kPa.

The compressive stress at 50% strain of the expanded beads molded article can be determined based on JIS K6767:1999. This is the value obtained by measuring stress (kPa) when a test piece having a length of 50 mm, a width of 50 mm, and a thickness of 25 mm is cut out from the expanded beads molded article excluding the skin layer and compressed to 50% at a compression rate of 10 mm/min. The compressive stress at 50% strain is an index of stiffness of the expanded beads molded article.

EXAMPLES

Hereinafter, the present invention will be described in detail with reference to Examples, but the present invention is not limited thereto. For each of Examples and Comparative Examples performed as follows, the bulk density, high-temperature peak heat quantity, and average cell diameter of the obtained expanded beads, and the molded article density, tensile strength, and compressive stress at 50% strain of the obtained expanded beads molded article were measured. In addition, the appearance of the expanded beads molded article was evaluated. The measurement results and the evaluation results are shown in Tables 2 and 3. In the tables, carbon black is described as CB.

Resins 1 to 3 composed of 100 wt % of a polypropylene resin that is virgin shown in Table 1 were used as a virgin polypropylene-based resin (virgin PP-based resin) or a polyolefin-based resin (PO-based resin) for forming a covering layer. The recovered materials 1 to 8 shown in Table 1 were used as a polypropylene-based resin recovered materials (PP-based resin recovered materials).

(Measurement of Ash Content of Polypropylene-Based Resin Recovered Materials)

The ash content of the polypropylene-based resin recovered materials was measured based on JIS K6226-2:2003.

As the measuring apparatus, a thermogravimetric analyzer TGA701 manufactured by LECO Corporation was used. Specifically, about 5 g of a polypropylene-based resin recovered materials as a measurement sample was collected and weighed and then put in a crucible, the inside of a heating furnace was set to a nitrogen stream, (1) heating was performed so that the temperature of the heating furnace was from room temperature to 105° C. at a heating rate of 10° C./min under a nitrogen atmosphere, then, (2) the temperature was held at 105° C. until the measured weight reached equilibrium, (3) heating was performed at a heating rate of 10° C./min from 105° C. to 550° C., (4) the temperature was held at 550° C. until the measured weight reached equilibrium, (5) the heating furnace stream was replaced from nitrogen to air, and heating was performed from 550° C. to 950° C. at a heating rate of 10° C./min, (6) weight W1 of the combustion residue after holding at 950° C. for 10 minutes was determined, and (7) the temperature was cooled to room temperature. The value (wt %) obtained by dividing the weight W1 of the combustion residue by the weight (5 g) of the measurement sample placed in the crucible and multiplying it by 100 (weight %) is multiplied by 10000 to determine the ash content (ppm by weight) of the recovered material.

The above operation was performed twice, and the arithmetic mean of these values was defined as the ash content of the polypropylene-based resin recovered materials. The measured ash content was shown in Table 1.

(Measurement of Content Ratio of Carbon Black in Polypropylene-Based Resin Recovered Materials)

The content ratio of carbon black contained in the polypropylene-based resin recovered materials was performed based on JIS K6226-2:2003. As the measuring apparatus, a thermogravimetric analyzer TGA701 manufactured by LECO Corporation was used. Specifically, about 5 g of a polypropylene-based resin recovered materials as a measurement sample was weighed and then collected and put in a crucible, the inside of a heating furnace was set to a nitrogen stream, (1) heating was performed so that the temperature of the heating furnace was from room temperature to 105° C. at a heating rate of 10° C./min under a nitrogen atmosphere, then, (2) the temperature was held at 105° C. until the measured weight reached equilibrium, (3) heating was performed at a heating rate of 10° C./min from 105° C. to 550° C., (4) weight W1 of the combustion residue after holding at 550° C. until the measured weight reached equilibrium was determined, furthermore, (5) the heating furnace stream was replaced from nitrogen to air, and heating was performed from 550° C. to 950° C. at a heating rate of 10° C./min, and (6) weight W2 of the combustion residue after holding at 950° C. for 10 minutes was determined. By multiplying the value obtained by dividing weight W3 obtained by subtracting weight W2 from weight W1 by the weight of the measurement sample put in the crucible by 100, the content (wt %) of CB with respect to 100 wt % of the polypropylene-based resin recovered materials was obtained. The above operation was performed twice, and the arithmetic mean of these values was defined as the content ratio of carbon black in the polypropylene-based resin recovered materials. The measured content ratio of carbon black was shown in Table 1.

(Measurement of Melting Point of Polypropylene-Based Resin Recovered Materials)

The melting point of the polypropylene-based resin recovered materials used in the present invention was measured based on JIS K7121-1987. At this time, as condition adjustment of a test piece, "(2) Case where melting temperature is measured after constant heat treatment" in the above standard was adopted. More specifically, the peak top temperature of the melting peak determined by the DSC curve was defined as the melting point of the polypropylene-based resin recovered materials; the DSC curve was obtained when approximately 2 mg of a polypropylene-based resin recovered materials was used as a test piece, and based on a heat-flux differential scanning calorimetry described in JIS K7121-1987, the temperature was raised from 23° C. to 200° C. at a heating rate of 10° C./min, then lowered to 23° C. at a cooling rate of 10° C./min, and raised again from 23° C. to 200° C. at a heating rate of 10° C./min. When two or more melting peaks appeared in the DSC curve, the peak top temperature of the melting peak having the largest area was defined as the melting point. As the measuring apparatus, a heat-flux differential scanning calorimeter (manufactured by SII NanoTechnology Inc., model number: DSC7020) was used. The measurement of the melting point of the polypropylene-based resin recovered materials was measured using the polypropylene-based resin recovered materials containing carbon black as a test piece. The measured melting point was shown in Table 1.

Example 1

(Preparation of Resin Beads)

A production apparatus equipped with an extruder for forming a core layer having an inner diameter of 50 mm, a die for forming a multilayer strand provided on the downstream side of the extruder for forming a core layer, and an extruder for forming a covering layer having an inner diameter of 30 mm was prepared. The production apparatus had a configuration such that the downstream side of the extruder for forming a covering layer is connected to the die for forming a multilayer strand, and that a melt-kneaded product for forming each layer can be laminated in the die and co-extrusion can be performed.

As a core layer-forming material constituting the core layer, resin 1 (propylene-based random copolymer) and recovered materials 1 shown in Table 1 were used in the blending ratio shown in Table 2. In addition to these materials, carbon black (furnace black) and zinc borate ("Fire Break ZB" manufactured by Borax) as a cell controlling agent were used. The blending ratio of the blended carbon black and zinc borate is a ratio when the mixture (total of virgin PP-based resin, PP-based resin recovered materials, and additive) is 100 wt %. The core layer-forming material was supplied to the extruder for forming a core layer and melt-kneaded.

As polyolefin-based resins constituting the covering layer, resin 2 (propylene-based random copolymer) shown in Table 1 and CB (furnace black) were used in the blending ratio shown in Table 2, and these were supplied to the extruder for forming a covering layer and melt-kneaded. The blending ratio of the carbon black blended in the covering layer is a ratio when the total of resin 2 and the carbon black blended in the covering layer is 100 wt %.

The mixture for forming each layer obtained by melt-kneading as described above was introduced into the die for forming a multilayer strand and joined in the die, and a multilayer strand having a two-layer structure (covering layer/core layer structure) was extruded from pores of a spinneret attached to the downstream side of the die. The extruded strand was cooled with water and cut with a pelletizer to obtain cylindrical resin beads having an average weight of 1.0 mg per bead.

(Preparation of Expanded Beads)

20 kg of the obtained resin beads and 60 L of water as an aqueous medium were supplied into a sealed vessel having a content amount of 100 L. In addition, with respect to 100 parts by weight of the resin beads, 0.4 parts by weight of kaolin as an inorganic dispersant, 0.045 parts by weight (as an active ingredient) of sodium alkylbenzene sulfonate as a dispersion auxiliary agent, and 0.018 parts by weight of aluminum sulfate were each added in the sealed vessel.

Next, carbon dioxide as a blowing agent was injected into the sealed vessel and pressurized until the gauge pressure reached 1.8 MPa (G). The pressure denoted by (G) is a gauge pressure, that is, a value of a pressure based on the atmospheric pressure. Thereafter, the inside of the sealed vessel was heated to raise the temperature to a foaming temperature (151.8° C.) at a heating rate of 2° C./min with stirring, and held at the same temperature for 15 minutes. As a result, a high-temperature peak was adjusted to appear in an endothermic curve by DSC measurement of the resulting expanded beads.

Thereafter, the contents (resin beads and water) of the sealed vessel were released under atmospheric pressure to obtain expanded beads (single-stage expanded beads) having a bulk density of 77 kg/m³.

(Two-Stage Foaming)

The single-stage expanded beads obtained as described above were allowed to stand for 24 hours in an environment of an air temperature of 23° C., a relative humidity of 50%, and 1 atm for aging. Then, the pressurizable sealed vessel was filled with the single-stage expanded beads after aging, and the pressure in the sealed vessel was increased from normal pressure to pressurize the expanded beads. The state in which the expanded beads were pressurized was maintained for a predetermined time, and the inside of cells of the expanded beads was impregnated with air. Thereafter, the single-stage expanded beads were taken out from the sealed vessel to obtain single-stage expanded beads in which the internal pressure of the cells of the expanded beads was 0.7 MPa (G). Thereafter, the single-stage expanded beads were supplied to a two-stage foaming apparatus. Steam was supplied into the apparatus to expand the single-stage expanded beads, thereby obtaining expanded beads having a bulk density of 22 kg/m³. The expanded beads obtained by two-stage foaming were used for the following measurement, production of an expanded beads molded article, and the like.

(Measurement of Expanded Beads)

The bulk density of the single-stage expanded beads and the two-stage expanded beads obtained as described above was measured as follows. In addition, the high-temperature peak heat quantity and the cell diameter of the single-stage expanded beads were measured as follows.

<Bulk Density of Expanded Beads>

The expanded beads to be measured were allowed to stand for 24 hours or more in an environment of an air temperature of 23° C., a relative humidity of 50%, and 1 atm. The expanded beads group thus obtained having weight W (g) was filled in a measuring cylinder, and by lightly tapping the floor surface several times with the bottom surface of the measuring cylinder, the filling height of the expanded beads group in the measuring cylinder was stabilized. Bulk volume V (L) of the expanded beads group indicated by the scale of the measuring cylinder was read, and weight W of the expanded beads group was divided by bulk volume V of the expanded beads group (W/V). By converting the value thus obtained into a unit of kg/m³, the bulk density (kg/m³) of the expanded beads was obtained.

<High-Temperature Peak Heat Quantity of Expanded Beads>

About 1 mg of expanded beads was used as a test piece. The test piece was heated and melted according to a plastic transition heat measurement method described in JIS K7121-1987, and a DSC curve at this time was obtained. The measurement temperature range was set from 23° C. to a temperature 30° C. higher than a temperature at the end of a melting peak of the test piece, and the heating rate during heating was set to 10° C./min, so that a first DCS curve was obtained.

The first DSC curve thus obtained is shown in FIG. 1. In the DSC curve, a straight line connecting point I corresponding to 80° C. on the DSC curve and point II corresponding to the end temperature of melting of the expanded beads was drawn. The end temperature of melting is an end point on a high-temperature side of high-temperature peak b, and is an intersection of high-temperature peak b and the baseline on a higher-temperature side than high-temperature peak b in the DSC curve.

As shown in FIG. 1, a straight line connecting point I and point II was drawn, and then an intersection of a straight line passing through maximum point III existing between intrinsic peak a and high-temperature peak b and parallel to the vertical axis of the graph and a straight line connecting point I and point II was defined as IV.

Then, the area of a straight line connecting point I and point IV, a straight line connecting point III and point IV, and a DSC curve connecting point I and point III was defined as the area of intrinsic peak a. In addition, the area of a portion (shaded portion) surrounded by a straight line connecting point IV and point II, a straight line connecting point III and point IV, and a DSC curve connecting point III and point II was defined as the area of high-temperature peak b, and this was defined as the value of the high-temperature peak heat quantity of the expanded beads.

After the first DSC curve was obtained as described above, a second DSC curve measured when the test piece was kept at the end temperature of heating for 10 minutes, then cooled to 30° C. at a cooling rate of 10° C./min, and heated and melted again at a heating rate of 10° C./min to an end temperature of heating that is 30° C. higher than a temperature at the end of a melting peak was obtained. It was confirmed that no high-temperature peak appeared in the second DSC curve.

(Average Cell Diameter of Expanded Beads)

A photograph of a cross section obtained by bisecting the expanded beads was taken. In the taken enlarged photograph of the cross section of the expanded beads, four line segments passing through substantially the center of the cross section of the expanded beads were drawn from one surface to the other surface of the expanded beads. The line segment was drawn so as to form radial straight lines extending in eight directions at equal intervals from substantially the center of the cross section of the expanded beads to the surface of the cut beads. Next, total number N (pieces) of cells intersecting the four line segments was obtained. Sum L (μm) of the lengths of the four line segments was determined, and the value (L/N) obtained by dividing sum L by total number N was defined as the average cell diameter of one expanded bead. This operation was performed on 30 expanded beads, and the value obtained by arithmetically averaging the average cell diameters of the expanded beads was defined as the average cell diameter of the expanded beads.

(Production of Expanded Beads Molded Article)

The expanded beads obtained as described above were filled in a pressurized filling hopper and then pressurized to 0.20 MPa (G) with compressed air. The expanded beads were immediately filled in a mold (metal mold) having a molding cavity capable of molding a rectangular parallelepiped molded article of 400 mm length×300 mm width×80 mm height, and heating was performed by the following heating method. As the heating method, in a state where drain valves provided on both surfaces of the metal mold were opened, steam was supplied to the metal mold to perform preheating (exhaust step). Thereafter, steam was supplied from one side of the metal mold for heating, and steam was further supplied from the other side of the metal mold for heating. Subsequently, steam was supplied from both sides of the metal mold at a molding heating steam pressure of 0.32 MPa (G) for heating. After the end of the heating, the pressure was released, water cooling was performed for 20 seconds, and then vacuum cooling was performed until the surface pressure by the foaming force of the expanded beads molded article reached 0.05 MPa (G), and then the metal mold was opened to take out the expanded beads molded article. The obtained expanded beads molded article was aged in an oven at 80° C. for 12 hours, and then slowly cooled to room temperature to obtain an expanded beads molded article having a rectangular parallelepiped shape with the above size.

The obtained expanded beads molded article was subjected to the following evaluation and measurement.

(Evaluation of Expanded Beads Molded Article)

<Appearance Evaluation (Secondary Foaming Basis)>

As the evaluation of the surface appearance of the expanded beads molded article, a rectangle of 100 mm×100 mm was drawn in the central portion of the expanded beads molded article, a line was drawn diagonally from the corner of the rectangular area, the number of voids (gaps) having a size of 1 mm×1 mm or more on the line was counted, and the degree of the voids (gaps) between the expanded beads was evaluated as follows.

4 (VERY GOOD): The number of voids was less than 5.
3 (GOOD): The number of voids was 5 or more and less than 10.
2 (POOR): The number of voids was 10 or more and less than 15.
1 (BAD): The number of voids was 15 or more.

<Appearance (Color Basis)>

Color unevenness was visually evaluated by four-grade evaluation from (1) having significant color unevenness to (4) having no color unevenness on the plate surface of the expanded beads molded article, and the color unevenness of the expanded beads molded article was evaluated according to the following criteria based on the average value of the evaluations by five observers. Note that the observer is a person who has been trained in advance so that color unevenness can be evaluated on certain criteria.

4 (VERY GOOD): 4 or more points
3 (GOOD): 3.5 points or more and less than 4 points
2 (POOR): 3 points or more and less than 3.5 points
1 (BAD): less than 3 points (Measurement of Physical Properties of Expanded Beads Molded Article)

<Density of Molded Article>

The expanded beads molded article was cut into a size of 50 mm×50 mm×50 mm, and this was used as a test piece. The weight of the test piece was measured, the weight was divided by the volume obtained by immersing the test piece in a measuring cylinder filled with water and measuring the rise in the water level, and the obtained volume was defined as the density of the molded article.

<Tensile Strength>

The tensile strength is a value measured based on JIS K6767:1999. A plate-shaped piece having a thickness of 10 mm was cut out from the central portion of the expanded beads molded article so as not to include the skin layer, and then punched into a dumbbell-shaped No. 1 type using a pressing machine to prepare a test piece. This test piece was conditioned in a standard state for 24 hours, and then tested at a test rate of 500 mm/min using Autograph AGS-X universal tester manufactured by Shimadzu Corporation, and the tensile strength was determined. The maximum load obtained in the test was defined as the tensile strength, and the average value of the tensile strengths obtained for five test pieces was shown in the table.

<Compressive Stress at 50% Strain>

A test piece of 50 mm length×50 mm width×25 mm thickness was cut out from the expanded beads molded article excluding the skin, and a compression test was performed at a compression rate of 10 mm/min based on JIS K6767:1999 to determine the 50% compressive stress of the expanded beads molded article. The test was performed on five test pieces, and the average value of the obtained values was described in the table as the compressive stress at 50% strain.

Examples 2 to 9, Comparative Examples 1 to 6, and Reference Examples 1 and 2 were performed as follows, and measurement and evaluation were performed in the same manner as in Example 1. However, the expanded beads molded articles produced in Comparative Examples 2 and 3 were brittle with many gaps between the expanded beads, and the expanded beads molded articles produced in Comparative Example 4 were severely shrunk, and were all poor in molding. Therefore, for these, evaluation and measurement of physical properties were not performed.

Examples 2 to 5

Expanded beads and an expanded beads molded article were produced in the same manner as in Example 1 except that the contents and blending ratios of the resin materials and the additives used were changed to those shown in Table 2.

Example 6

Expanded beads and an expanded beads molded article were produced in the same manner as in Example 1 except that the contents and blending ratios of the resin materials and the additives used were changed to those shown in Table 2, and two-stage foaming was not performed.

Examples 7 and 8

Expanded beads and an expanded beads molded article were produced in the same manner as in Example 1 except that resin 3 (propylene-based random copolymer) shown in Table 1 was used as the virgin polypropylene-based resin constituting the core layer, and the contents and blending ratios of the recovered materials and the additives were changed to those shown in Table 2.

Example 9

Expanded beads and an expanded beads molded article were produced in the same manner as in Example 1 except that the contents and blending ratios of the resin materials and the additives used were changed to those shown in Table 2, the covering layer was not provided, and single-layer expanded beads were produced.

Comparative Examples 1 to 6

Expanded beads and an expanded beads molded article were produced in the same manner as in Example 1 except that the contents and blending ratios of the resin materials and the additives used were changed to those shown in Table 3, and the same measurement and evaluation as in Example 1 were performed.

Reference Example 1

Expanded beads and an expanded beads molded article were produced in the same manner as in Example 1 except that the recovered materials was not used, and the same measurement and evaluation as in Example 1 were performed. Multilayer expanded beads composed of only a virgin polypropylene resin and an expanded beads molded article are shown in Table 3 for reference.

Reference Example 2

Expanded beads and an expanded beads molded article were produced in the same manner as in Example 1 except that the recovered materials was not used and the covering layer was not provided, and the same measurement and evaluation as in Example 1 were performed. Single-layer expanded beads composed of only a virgin polypropylene resin and an expanded beads molded article are shown in Table 3 for reference.

TABLE 1

|  | MFR (*1) g/10 min. 230° C. | Melting point (*2) ° C. | CB content (*3) wt % | Ash content (*4) ppm by weight |
|---|---|---|---|---|
| Resin 1 | 5.0 | 151 | 0.0 | — |
| Resin 2 | 5.0 | 134 | 0.0 | — |
| Resin 3 | 10 | 151 | 0.0 | — |
| Recovered materials 1 | 8.3 | 155 | 2.3 | 3760 |
| Recovered materials 2 | 7.8 | 150 | 2.3 | 1820 |
| Recovered materials 3 | 12 | 150 | 2.0 | 5150 |
| Recovered materials 4 | 20 | 151 | 0.9 | 800 |
| Recovered materials 5 | 5.9 | 149 | 2.1 | 2130 |
| Recovered materials 6 | 3.0 | 151 | 2.0 | 3500 |
| Recovered materials 7 | 6.0 | 164 | 2.1 | 3800 |
| Recovered materials 8 | 7.5 | 151 | 8.0 | 1500 |

(*1) represents a melt flow rate obtained under conditions of 230° C. under a load of 2.16 kg based on JIS K7210-1: 2014.

(*2) represents a melting point (peak top temperature of the largest endothermic peak of the second heating in DSC measurement) measured based on JIS K7121-1987.

(*3) represents a content of CB measured based on JIS K6226-2: 2003.

(*4) represents an ash content measured based on JIS K6226-2: 2003.

TABLE 2

|  |  |  |  |  | Example 1 | Example 2 | Example 3 | Example 4 |
|---|---|---|---|---|---|---|---|---|
| Resin beads | Core layer | Virgin PP-based resin | Name | — | Resin 1 | Resin 1 | Resin 1 | Resin 1 |
|  |  |  | Melting point | ° C. | 151 | 151 | 151 | 151 |
|  |  |  | MFR | g/10 min | 5.0 | 5.0 | 5.0 | 5.0 |
|  |  |  | Blending ratio in mixture | wt % | 75 | 50 | 75 | 75 |
|  |  | PP-based resin recovered materials | Name | — | Recovered materials 1 | Recovered materials 1 | Recovered materials 2 | Recovered materials 3 |
|  |  |  | Blending ratio in mixture | wt % | 25 | 50 | 25 | 25 |
|  |  |  | Melting point | ° C. | 155 | 155 | 150 | 150 |
|  |  |  | MFR | g/10 min | 8.3 | 8.3 | 7.8 | 12 |
|  |  |  | CB content in recovered materials | wt % | 2.3 | 2.3 | 2.3 | 2.0 |
|  |  |  | Ash content in recovered materials | ppm by weight | 3760 | 3760 | 1820 | 5150 |
|  |  |  | Difference between MFR of PP resin and MFR of recovered materials | — | 3.3 | 3.3 | 2.8 | 7.0 |
|  |  | Additive | CB content | wt % | 1.7 | 1.7 | 1.7 | 1.7 |
|  |  |  | Zinc borate content | ppm by weight | 300 | 300 | 300 | 300 |
|  |  |  | CB content in core layer | wt % | 2.3 | 2.8 | 2.3 | 2.7 |
|  | Covering layer | PO-based resin | Name | — | Resin 2 | Resin 2 | Resin 2 | Resin 2 |
|  |  |  | Melting point | ° C. | 134 | 134 | 134 | 134 |
|  |  |  | MFR | g/10 min | 5 | 5 | 5 | 5 |
|  |  | Additive | CB content | wt % | 2.8 | 2.8 | 2.8 | 2.8 |
|  |  |  | Weight ratio (core layer:covering layer) | — | 97:3 | 97:3 | 97:3 | 97:3 |
|  |  |  | Melting point of resin beads | ° C. | 152 | 153 | 151 | 151 |
|  |  |  | CB content in resin beads | wt % | 2.3 | 2.8 | 2.3 | 2.2 |
| Expanded beads | Single-stage |  | Bulk density | kg/m³ | 77 | 76 | 77 | 76 |
|  |  |  | High-temperature peak heat quantity | J/g | 18.1 | 18.0 | 15.8 | 16.6 |
|  | Two-stage |  | Average cell diameter | μm | 130 | 125 | 155 | 115 |
| Foam molded article | Evaluation |  | Bulk density | kg/m³ | 22 | 22 | 22 | 22 |
|  |  |  | Appearance (secondary foaming basis) | — | 4 | 4 | 4 | 4 |
|  |  |  | Appearance (color basis) | — | 4 | 4 | 4 | 4 |
|  | Physical properties |  | Density of molded article | kg/m³ | 39 | 39 | 38 | 41 |
|  |  |  | Tensile strength | kPa | 702 | 691 | 677 | 557 |
|  |  |  | Compression stress at 50% strain | kPa | 276 | 267 | 296 | 266 |

|  |  |  |  | Example 5 | Example 6 | Example 7 | Example 8 | Example 9 |
|---|---|---|---|---|---|---|---|---|
| Resin beads | Core layer | Virgin PP-based resin | Name | Resin 1 | Resin 1 | Resin 3 | Resin 3 | Resin 1 |
|  |  |  | Melting point | 151 | 151 | 151 | 151 | 151 |
|  |  |  | MFR | 5.0 | 5.0 | 10 | 10 | 5.0 |
|  |  |  | Blending ratio in mixture | 75 | 75 | 75 | 75 | 75 |
|  |  | PP-based resin recovered materials | Name | Recovered materials 5 | Recovered materials 1 | Recovered materials 3 | Recovered materials 4 | Recovered materials 1 |
|  |  |  | Blending ratio in mixture | 25 | 25 | 25 | 25 | 25 |
|  |  |  | Melting point | 149 | 155 | 150 | 151 | 155 |
|  |  |  | MFR | 5.9 | 8.3 | 12 | 20 | 8.3 |
|  |  |  | CB content in recovered materials | 2.1 | 2.3 | 2.0 | 0.9 | 2.3 |
|  |  |  | Ash content in recovered materials | 2130 | 3760 | 5150 | 800 | 3760 |
|  |  |  | Difference between MFR of PP resin and MFR of recovered materials | 0.9 | 3.3 | 2.0 | 10.0 | 3.3 |
|  |  | Additive | CB content | 1.7 | 2.8 | 2.8 | 1.7 | 1.7 |
|  |  |  | Zinc borate content | 300 | 900 | 900 | 300 | 300 |
|  |  |  | CB content in core layer | 2.2 | 3.4 | 3.3 | 1.9 | 2.3 |
|  | Covering layer | PO-based resin | Name | Resin 2 | Resin 2 | Resin 2 | Resin 2 | — |
|  |  |  | Melting point | 134 | 134 | 134 | 134 | — |
|  |  |  | MFR | 5 | 5 | 5 | 5 | — |
|  |  | Additive | CB content | 2.8 | 2.8 | 2.8 | 2.8 | — |
|  |  |  | Weight ratio (core layer:covering layer) | 97:3 | 97:3 | 97:3 | 97:3 | — |
|  |  |  | Melting point of resin beads | 151 | 152 | 151 | 151 | 152 |
|  |  |  | CB content in resin beads | 2.2 | 3.4 | 3.3 | 2.0 | — |
| Expanded beads | Single-stage |  | Bulk density | 73 | 35 | 35 | 75 | 75 |
|  |  |  | High-temperature peak heat quantity | 17.6 | 17.0 | 21.0 | 21.0 | 17.5 |
|  | Two-stage |  | Average cell diameter | 188 | 145 | 125 | 100 | 132 |
| Foam molded article | Evaluation |  | Bulk density | 21 | — | 22 | 22 | 22 |
|  |  |  | Appearance (secondary foaming basis) | 4 | 4 | 4 | 4 | 3 |
|  |  |  | Appearance (color basis) | 4 | 4 | 4 | 4 | 4 |
|  | Physical properties |  | Density of molded article | 41 | 56 | 39 | 40 | 40 |
|  |  |  | Tensile strength | 589 | 911 | 532 | 703 | 558 |
|  |  |  | Compression stress at 50% strain | 279 | 435 | 275 | 279 | 276 |

TABLE 3

| | | | Property | Unit | Comparative Example 1 | Comparative Example 2 | Comparative Example 3 | Comparative Example 4 |
|---|---|---|---|---|---|---|---|---|
| Resin beads | Core layer | Virgin PP-based resin | Name | — | Resin 1 | Resin 1 | Resin 1 | Resin 1 |
| | | | Melting point | °C | 151 | 151 | 151 | 151 |
| | | | MFR | g/10 min. | 5 | 5 | 5 | 5 |
| | | | Blending ratio in mixture | wt % | 75 | 75 | 25 | 75 |
| | | PP-based resin recovered materials | Name | — | Recovered materials 6 | Recovered materials 7 | Recovered materials 1 | Recovered materials 4 |
| | | | Blending ratio in mixture | wt % | 25 | 25 | 75 | 25 |
| | | | Melting point | °C | 151 | 164 | 155 | 151 |
| | | | MFR | g/10 min. | 3.0 | 6.0 | 8.3 | 20 |
| | | | CB content in recovered materials | wt % | 2.0 | 2.1 | 2.3 | 0.9 |
| | | | Ash content in recovered materials | ppm by weight | 3500 | 3800 | 3760 | 800 |
| | | | Difference between MFR of PP resin and MFR of recovered materials | — | −2.0 | 1.0 | 3.3 | 15.0 |
| | | Additive | CB content | wt % | 1.7 | 1.7 | 1.7 | 1.7 |
| | | | Zinc borate content | ppm by weight | 300 | 300 | 300 | 300 |
| | | | CB content in core layer | wt % | 2.2 | 2.2 | 3.4 | 1.9 |
| | Covering layer | PO-based resin | Name | — | Resin 2 | Resin 2 | Resin 2 | Resin 2 |
| | | | Melting point | °C | 134 | 134 | 134 | 134 |
| | | | MFR | g/10 min. | 5 | 5 | 5 | 5 |
| | | Additive | CB content | wt % | 2.8 | 2.8 | 2.8 | 2.8 |
| | | | Weight ratio (core layer:covering layer) | — | 97:3 | 97:3 | 97:3 | 97:3 |
| | | | Melting point of resin beads | °C | 151 | 155 | 154 | 151 |
| | | | CB content in resin beads | wt % | 2.2 | 2.2 | 3.4 | 1.9 |
| Expanded beads | Single-stage | | Bulk density | kg/m³ | 78 | 76 | 76 | 75 |
| | | | High-temperature peak heat quantity | J/g | 17.5 | 24.0 | 18.0 | 17.0 |
| | | | Average cell diameter | μm | 150 | 80 | 120 | 67 |
| | Two-stage | | Bulk density | kg/m³ | 22 | 28 | 28 | 22 |
| Foamed molded article | Evaluation | | Appearance (secondary foaming basis) | — | 1 | Molding was | Molding was | Molding was |
| | | | Appearance (color basis) | — | 1 | impossible | impossible | impossible |
| | Physical properties | | Density of molded article | kg/m³ | 38 | Not evaluated | Not evaluated | Not evaluated |
| | | | Tensile strength | kPa | 641 | | | |
| | | | Compressive stress at 50% strain | kPa | 219 | | | |

| | | | Property | Comparative Example 5 | Comparative Example 6 | Reference Example 1 | Reference Example 2 |
|---|---|---|---|---|---|---|---|
| Resin beads | Core layer | Virgin PP-based resin | Name | Resin 1 | Resin 1 | Resin 1 | Resin 1 |
| | | | Melting point | 151 | 151 | 151 | 151 |
| | | | MFR | 5 | 5 | 5 | 5 |
| | | | Blending ratio in mixture | 75 | 75 | 100 | 100 |
| | | PP-based resin recovered materials | Name | Recovered materials 8 | Recovered materials 8 | — | — |
| | | | Blending ratio in mixture | 25 | 25 | — | — |
| | | | Melting point | 151 | 151 | — | — |
| | | | MFR | 7.5 | 7.5 | — | — |
| | | | CB content in recovered materials | 8.0 | 8.0 | — | — |
| | | | Ash content in recovered materials | 1500 | 1500 | — | — |
| | | | Difference between MFR of PP resin and MFR of recovered materials | 2.5 | 2.5 | — | — |
| | | Additive | CB content | 1.7 | 0 | 1.7 | 1.7 |
| | | | Zinc borate content | 300 | 300 | 300 | 300 |
| | | | CB content in core layer | 3.7 | 2.0 | 1.7 | — |
| | Covering layer | PO-based resin | Name | Resin 2 | Resin 2 | Resin 2 | — |
| | | | Melting point | 134 | 134 | 134 | — |
| | | | MFR | 5 | 5 | 5 | — |
| | | Additive | CB content | 2.8 | 2.8 | 2.8 | — |
| | | | Weight ratio (core layer:covering layer) | 97:3 | 97:3 | 97:3 | — |
| | | | Melting point of resin beads | 151 | 151 | 151 | 151 |
| | | | CB content in resin beads | 3.7 | 2.0 | 1.7 | — |
| Expanded beads | Single-stage | | Bulk density | 77 | 76 | 75 | 75 |
| | | | High-termperature peak heat quantity | 17.8 | 18.0 | 18.0 | 18.0 |
| | | | Average cell diameter | 150 | 152 | 160 | 170 |
| | Two-stage | | Bulk density | 23 | 22 | 22 | 22 |
| Foamed molded article | Evaluation | | Appearance (secondary foaming basis) | 2 | 2 | 4 | 4 |
| | | | Appearance (color basis) | 4 | 2 | 4 | 4 |
| | Physical properties | | Density of molded article | 38 | 39 | 40 | 39 |
| | | | Tensile strength | 510 | 515 | 696 | 552 |
| | | | Compressive stress at 50% strain | 262 | 265 | 290 | 287 |

The present invention described above includes the following technical ideas.

(1) A method for producing polypropylene-based resin expanded beads, the method including:

a mixing step of melt-mixing a polypropylene-based resin having a melt flow rate of 1 g/10 min or more and 15 g/10 min or less at 230° C. under a load of 2.16 kg and a polypropylene-based resin recovered materials comprising of a recovered materials of a post-consumer recycled material of a polypropylene-based resin foamed molded article with an extruder to obtain a mixture;

an extrusion step of extruding the mixture obtained in the mixing step from the extruder and cutting the mixture to obtain polypropylene-based resin beads; and a foaming step of impregnating the polypropylene-based resin beads obtained in the extrusion step with a blowing agent and foaming the polypropylene-based resin beads impregnated with the blowing agent to obtain polypropylene-based resin expanded beads, wherein in the mixture, a blending ratio of the polypropylene-based resin is 30 wt % or more and 90 wt % or less, and a blending ratio of the polypropylene-based resin recovered materials is 10 wt % or more and 70 wt % or less (herein, a total of the polypropylene-based resin and the polypropylene-based resin recovered materials is 100 wt %), the polypropylene-based resin recovered materials contains carbon black, and a content ratio of the carbon black in the polypropylene-based resin recovered materials is 0.5 wt % or more and 5 wt % or less, a melting point of the polypropylene-based resin recovered materials is 135° C. or higher and 160° C. or lower, a melt flow rate of the polypropylene-based resin recovered materials at 230° C. under a load of 2.16 kg is higher than a melt flow rate of the polypropylene-based resin at 230° C. under a load of 2.16 kg, and a difference between the melt flow rate of the polypropylene-based resin recovered materials and the melt flow rate of the polypropylene-based resin ((melt flow rate of polypropylene-based resin recovered materials)–(melt flow rate of polypropylene-based resin)) is 0.1 g/10 min or more and 12 g/10 min or less.

(2) The method for producing polypropylene-based resin expanded beads according to claim 1, wherein a melting point difference between the polypropylene-based resin and the polypropylene-based resin recovered materials ((melting point of polypropylene-based resin)–(melting point of polypropylene-based resin recovered materials)) is –10° C. or higher and +10° C. or lower.

(3) The method for producing polypropylene-based resin expanded beads according to (1) or (2), wherein an ash content of the polypropylene-based resin recovered materials is 10,000 ppm by weight or less.

(4) The method for producing polypropylene-based resin expanded beads according to any one of (1) to (3), wherein the melt flow rate of the polypropylene-based resin recovered materials at 230° C. under a load of 2.16 kg is 3 g/10 min or more and 20 g/10 min or less.

(5) The method for producing polypropylene-based resin expanded beads according to any one of (1) to (4), wherein in the mixture, the blending ratio of the polypropylene-based resin is 50 wt % or more and 80 wt % or less, and the blending ratio of the polypropylene-based resin recovered materials is 20 wt % or more and 50 wt % or less (herein, the total of the polypropylene-based resin and the polypropylene-based resin recovered materials is 100 wt %).

(6) The method for producing polypropylene-based resin expanded beads according to any one of (1) to (5), wherein a first DSC curve measured when the polypropylene-based resin expanded beads are used as a test piece and heated and melted at a heating rate of 10° C./min from 30° C. to an end temperature of heating that is 30° C. higher than a temperature at the end of a melting peak based on a heat-flux differential scanning calorimetry in JIS K7121-1987 has two or more melting peaks, the two or more melting peaks include a melting peak intrinsic to a resin constituting the resin expanded beads and a melting peak on a high-temperature side having a peak top temperature on a higher-temperature side than a peak top temperature of the melting peak intrinsic to the resin, and the melting peak on a high-temperature side does not appear in a second DSC curve measured when the test piece is then kept at the end temperature of heating for 10 minutes, then cooled to 30° C. at a cooling rate of 10° C./min, and heated and melted again at a heating rate of 10° C./min to an end temperature of heating that is 30° C. higher than a temperature at the end of a melting peak.

(7) The method for producing polypropylene-based resin expanded beads according to any one of (1) to (6), wherein the polypropylene-based resin expanded beads are multi-layer resin expanded beads having a covering layer made of their polyolefin-based resin on a surface.

(8) The method for producing polypropylene-based resin expanded beads according to any one of (1) to (7), wherein the melt flow rate of the polypropylene-based resin is 2 g/10 min or more and 8 g/10 min or less.

(9) The method for producing polypropylene-based resin expanded beads according to any one of (1) to (8), wherein the polypropylene-based resin recovered materials includes a recovered materials of a post-consumer recycled material of a polypropylene-based resin expanded beads molded article.

The invention claimed is:

1. A method for producing polypropylene-based resin expanded beads, the method comprising:

a mixing step of melt-mixing a polypropylene-based resin having a melt flow rate of 1 g/10 min or more and 15 g/10 min or less at 230° C. under a load of 2.16 kg and a polypropylene-based resin recovered materials comprising recovered materials of a post-consumer recycled material of a polypropylene-based resin foamed molded article with an extruder to obtain a mixture;

an extrusion step of extruding the mixture obtained in the mixing step from the extruder and cutting the mixture to obtain polypropylene-based resin beads; and a foaming step of impregnating the polypropylene-based resin beads obtained in the extrusion step with a blowing agent and foaming the polypropylene-based resin beads impregnated with the blowing agent to obtain polypropylene-based resin expanded beads, wherein in the mixture, a blending ratio of the polypropylene-based resin is 30 wt % or more and 90 wt % or less, and a blending ratio of the polypropylene-based resin recovered materials is 10 wt % or more and 70 wt % or less (herein, a total of the polypropylene-based resin and the polypropylene-based resin recovered materials is 100 wt %), the polypropylene-based resin recovered materials contains carbon black, and a content ratio of the carbon black in the polypropylene-based resin recovered materials is 0.5 wt % or more and 5 wt % or less, a melting point of the polypropylene-based resin recovered materials is 135° C. or higher and 160° C. or lower, a melt flow rate of the polypropylene-based resin recovered materials at 230° C. under a load of 2.16 kg is higher than a melt flow rate of the polypropylene-based resin at 230° C. under a load of 2.16 kg, and a difference between the melt flow rate of the polypropylene-based resin recovered materials and the melt flow rate of the polypropylene-based resin ((melt flow rate of polypropylene-based resin recovered materials)–(melt flow rate of polypropylene-based resin)) is 0.1 g/10 min or more and 12 g/10 min or less.

2. The method for producing polypropylene-based resin expanded beads according to claim 1, wherein a melting point difference between the polypropylene-based resin and the polypropylene-based resin recovered materials ((melting point of polypropylene-based resin)–(melting point of polypropylene-based resin recovered materials)) is –10° C. or higher and +10° C. or lower.

3. The method for producing polypropylene-based resin expanded beads according to claim 1, wherein an ash content of the polypropylene-based resin recovered materials is 10,000 ppm by weight or less.

4. The method for producing polypropylene-based resin expanded beads according to claim 1, wherein the melt flow rate of the polypropylene-based resin recovered materials at 230° C. under a load of 2.16 kg is 3 g/10 min or more and 20 g/10 min or less.

5. The method for producing polypropylene-based resin expanded beads according to claim 1, wherein in the mixture, the blending ratio of the polypropylene-based resin is 50 wt % or more and 80 wt % or less, and the blending ratio of the polypropylene-based resin recovered materials is 20 wt % or more and 50 wt % or less (herein, the total of the polypropylene-based resin and the polypropylene-based resin recovered materials is 100 wt %).

6. The method for producing polypropylene-based resin expanded beads according to claim 1, wherein a first DSC curve measured when the polypropylene-based resin expanded beads are used as a test piece and heated and melted at a heating rate of 10° C./min from 30° C. to an end temperature of heating that is 30° C. higher than a temperature at the end of a melting peak based on a heat-flux differential scanning calorimetry in JIS K7121-1987 has two or more melting peaks, the two or more melting peaks include a melting peak intrinsic to a resin constituting the resin expanded beads and a melting peak on a high-temperature side having a peak top temperature on a higher-temperature side than a peak top temperature of the melting peak intrinsic to the resin, and the melting peak on a high-temperature side does not appear in a second DSC curve measured when the test piece is kept at the end temperature of heating for 10 minutes, then cooled to 30° C. at a cooling rate of 10° C./min, and heated and melted again at a heating rate of 10° C./min to an end temperature of heating that is 30° C. higher than a temperature at the end of a melting peak.

7. The method for producing polypropylene-based resin expanded beads according to claim 1, wherein the polypropylene-based resin expanded beads are multilayer resin expanded beads having a covering layer made of a polyolefin-based resin on their surface.

8. The method for producing polypropylene-based resin expanded beads according to claim 1, wherein the melt flow rate of the polypropylene-based resin is 2 g/10 min or more and 8 g/10 min or less.

9. The method for producing polypropylene-based resin expanded beads according to claim 1, wherein the polypropylene-based resin recovered materials includes a recovered materials of a post-consumer recycled material of a polypropylene-based resin expanded beads molded article.

10. The method for producing polypropylene-based resin expanded beads according to claim 1, further comprising storing the expanded beads in a sealed vessel, injecting a gas into the sealed vessel to perform a pressurization treatment to increase an internal pressure of the expanded beads, and after the pressurization treatment, removing the expanded beads from the sealed vessel and heating to further expand the expanded beads, thereby performing a two-stage foaming step.

* * * * *